US005478903A

United States Patent [19]

Fujioka et al.

[11] Patent Number: 5,478,903

[45] Date of Patent: Dec. 26, 1995

[54] MALEIMIDE-BASED COPOLYMER, PROCESS FOR PRODUCING IT, AND THERMOPLASTIC RESIN COMPOSITION CONTAINING THE SAME

[75] Inventors: Kazumi Fujioka, Hyogo; Kazuhide Kuroda; Minoru Yamaguchi, both of Himeji, all of Japan

[73] Assignee: Nippon Shokubai Co., Ltd., Osaka, Japan

[21] Appl. No.: 400,127

[22] Filed: Mar. 6, 1995

Related U.S. Application Data

[60] Continuation of Ser. No. 167,067, Dec. 16, 1993, abandoned, which is a division of Ser. No. 866,449, Apr. 10, 1992, abandoned.

[30] Foreign Application Priority Data

Apr. 15, 1991 [JP] Japan .................................. 3-082682
Sep. 26, 1991 [JP] Japan .................................. 3-247915

[51] Int. Cl.$^6$ ........................ C08F 222/40; C08F 212/06
[52] U.S. Cl. ........................................ 526/262; 526/347
[58] Field of Search ................................ 526/262, 347

[56] References Cited

U.S. PATENT DOCUMENTS

| | | | |
|---|---|---|---|
| 2,971,939 | 2/1961 | Baer . | |
| 4,683,275 | 7/1987 | Kato et al. | 526/262 |

FOREIGN PATENT DOCUMENTS

| | | |
|---|---|---|
| 222924 | 5/1987 | European Pat. Off. . |
| 0541797 | 5/1993 | European Pat. Off. . |
| 58-162616 | 9/1983 | Japan . |
| 63-90557 | 4/1988 | Japan . |
| 2-51514 | 2/1990 | Japan . |
| 3-205411 | 9/1991 | Japan . |
| 8604337 | 7/1986 | WIPO . |
| 9015100 | 12/1990 | WIPO . |

OTHER PUBLICATIONS

Chem. Abstracts 113(2); 7023v (1990).

*Primary Examiner*—Joseph L. Schofer
*Assistant Examiner*—Wu C. Cheng
*Attorney, Agent, or Firm*—Armstrong, Westerman, Hattori, McLeland & Naughton

[57] ABSTRACT

A maleimide-based copolymer is provided, in which the content of compound (X) shown by the formula (I) is controlled in a range which does not adversely affect the physical properties of the copolymer. Such a copolymer includes an aromatic vinyl-based monomer unit and a maleimide-based monomer unit as essential components, proportion y of the maleimide-based monomer unit in structure is 35 to 65% by weight, and a content of the compound (X) is 3% or less and also, does not exceed a numeral value of 0.06y. The copolymer is prepared by radical copolymerization which is carried out by supplying gradually an aromatic vinyl-based monomer and a maleimide-based monomer into a reaction vessel under a condition of keeping these monomers separated without mixing together beforehand.

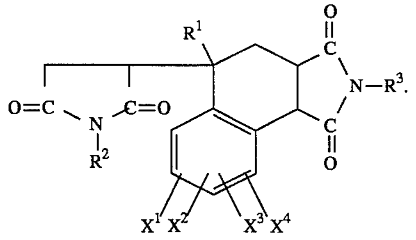

(I)

15 Claims, 3 Drawing Sheets

MALEIMIDE-BASED COPOLYMER, PROCESS FOR PRODUCING IT, AND THERMOPLASTIC RESIN COMPOSITION CONTAINING THE SAME

This application is a continuation of application Ser. No. 08/167,067, filed Dec. 16, 1993, now abandoned, which was a Division of application Ser. No. 07/866,449, filed Apr. 10, 1992, now abandoned.

BACKGROUND OF THE INVENTION

The present invention relates to a maleimide-based copolymer having high heat resistance and impact resistance, and showing a superior molding property and thermal stability, because of a fact that, when an aromatic vinyl-based monomer and a maleimide-based monomer is copolymerized, the content of slide products formed via a Diels-Alder type reaction is little.

The present invention relates to a process for producing a maleimide-based copolymer, which depresses greatly the amount of a compound (X) forming via the Diels-Alder type reaction between the aromatic vinyl-based monomer and the maleimide-based monomer existing as a side reaction in a copolymerization reaction of the aromatic vinyl-based monomer with the maleimide-based monomer.

The present invention relates to a thermoplastic resin composition which was improved in various properties such as heat resistance and so forth by combining a maleimide-based copolymer of the above type with other thermoplastic resins.

It has been known that the maleimide-based copolymer is a thermoplastic resin having a high heat deflection temperature and a high thermal decomposition temperature and, in general, the copolymer is used to elevate heat resistance, impact resistance and molding properties of articles in which other thermoplastic resins are used.

The maleimide-based copolymer is produced by usually copolymerizing the maleimide-based monomer and the aromatic vinyl-based monomer as well as, if necessary, another monomer.

Physical properties of the maleimide-based copolymer are affected by proportion of the maleimide-based monomer unit in structure and, if the proportion is low, heat resistance becomes low, so that a resin composition may not obtain excellent heat resistance and also, if the proportion is too high, molding and processing properties becomes bad and impact resistance may decrease.

A copolymer having a relatively small proportion of the maleimide-based monomer unit is generally prepared by emulsion polymerization or suspension polymerization. According to the emulsion polymerization, a maleimide-based copolymer having a high maleimide-based monomer unit is hard to soften and very difficult to recover from an emulsified solution and, therefore, a copolymer having a low proportion of the maleimide-based monomer unit has been produced. Then, a copolymer obtained from the emulsion polymerization shows bad impact resistance by an effect of a residual emulsifier etc, and coloring in the course of molding is very much. In the case of suspension polymerization, the aromatic vinyl-based monomer and maleimide-based monomer is liable to form an alternating copolymer and, therefore, when a copolymer having a high proportion of the maleimide-based monomer unit is desired to obtain, a heterogeneous copolymer is easy to form. In the solution polymerization and bulk polymerization, there have been carried out several attempts to obtain a copolymer in which a unreacted maleimide-based monomer is decreased by a maturing reaction or a polymer in which component distribution in the molecular weight division is narrow by using a defined polymerization process and the unreacted maleimide-based monomer is small in amount (Japanese Official Patent Provisional Publications, heisei 2-51514 and 3-205411 ).

When the maleimide-based monomer remains in the maleimide-based copolymer, the monomer is easy to become origin of coloring a molding or polluting a metal mold and also, it decreases heat resistance. Because of this, several -treatments have been carried out to decrease an residual amount of the unreacted maleimide-based monomer.

The suspension polymerization and polymerization have been adopted to obtain a maleimide-based copolymer having a high proportion of the maleimide-based monomer unit and being useful as a resin improver, however, even if the unreacted monomer is removed after polymerization, a copolymer inferior in physical properties such as heat resistance and impact resistance is formed.

Resin articles using a copolymer of this kind are not sufficiently elevated in mechanical strength and heat resistance.

According to inventors' studies, when a maleimide-based copolymer is made by carrying out a radical polymerization reaction between the maleimide-based monomer and the aromatic vinyl-based monomer, it was found that; the compound (X) is formed as a side product via a Diels-Alder type reaction between the maleimide-based monomer and the aromatic vinyl-based monomer. The inventors suspect the reaction course of, for example, N-phenylmaleimide with styrene as follows: The aromatic vinyl-based monomer (a) and a first maleimide-based monomer (b) makes an intermediate by the Diels-Alder type reaction as shown in the following formula (II) and this intermediate undergoes a reaction with a second maleimide-based monomer (b) to make the compound (X) as shown by the following formula (III).

(II)

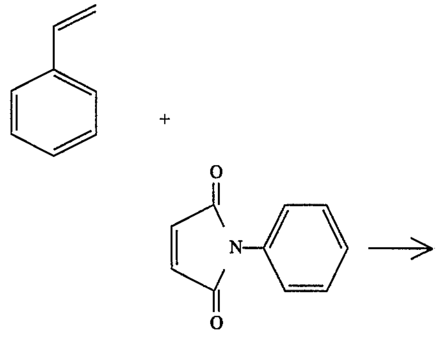

-continued

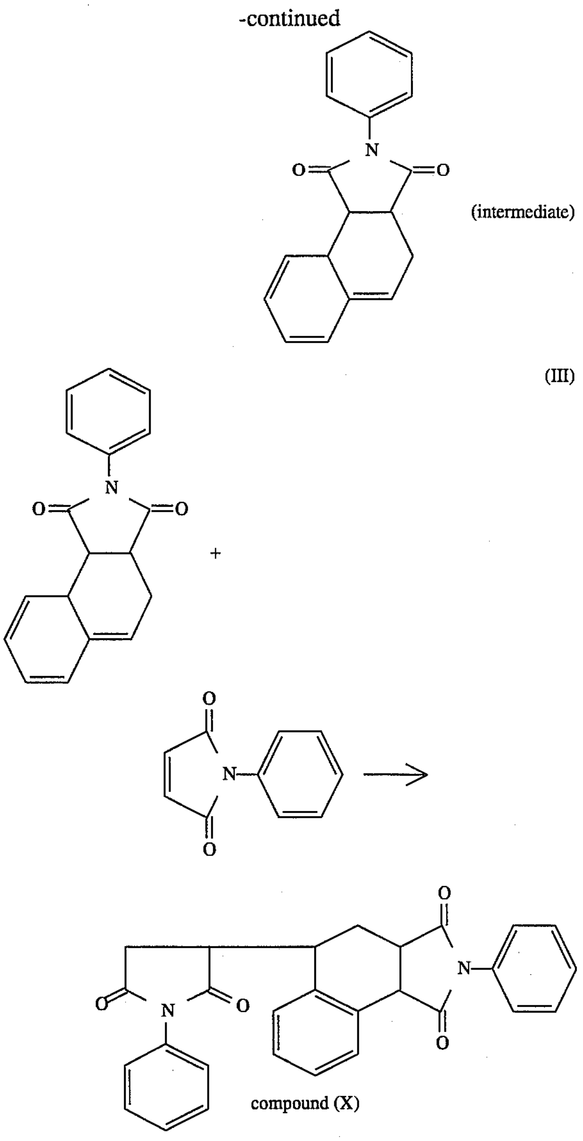

(intermediate)

(III)

compound (X)

The inventors studied extensively an effect of the compound (X) upon properties of the maleimide-based copolymer and, as a result, found that, if the maleimide-based copolymer contains the compound (X), the heat resistance decreases as well as the impact resistance decreases. Since a rate forming the compound (X) becomes faster with an increasing amount of the maleimide-based monomer used in polymerization, there is a trend that a content of the compound (X) increases with an increasing proportion of the maleimide-based monomer unit in the maleimide-based copolymer.

Accordingly, it is required to obtain a maleimide-based copolymer having a low content of the compound (X).

The compound (X) is not eliminated under a condition that the unreacted monomer is removed, but it remains and, therefore, it is necessary to think up a new process in order to decrease the content of compound (X) in the copolymer.

From a view point of avoiding increase of the unit process in after-polymerization, not dropping productivity, and not enlarging the distribution of composition and molecular weight in the copolymer, the inventors investigated a polymerization process which decrease the amount of compound (X) being produced as a side product in the course of the polymerization reaction as much as possible.

SUMMARY OF THE INVENTION

It is an object of this invention to provide a maleimide-based copolymer, in which the content of compound (X) is controlled in a range of not affecting badly upon physical properties of the maleimide-based copolymer and also, the content of residual volatile components is low.

It is a further object of this invention to provide a process for producing a maleimide-based copolymer of the above-described type directly from a polymerization reaction.

It is a still further object of the invention to provide a thermoplastic resin composition, in which the heat resistance, molding property and impact resistance are all improved by adding a maleimide-based copolymer of the abovedescribed type into other thermoplastic resins.

To attain the forementioned objects, in the maleimide-based copolymers which comprise the aromatic vinyl-based monomer unit (A) and maleimide-based monomer unit (B) as essential composing units, has proportion of the maleimide-based monomer unit (B) in structure in a range of from 35 to 65% by weight, and has volatile components in the content of 1,000 ppm or less;

there is provided in this invention a copolymer, which is characterized in that the content x of a compound (X) shown by the following general formula (I) is 3% by weight or less and also, it does not exceed a numeral value of 0.06y.

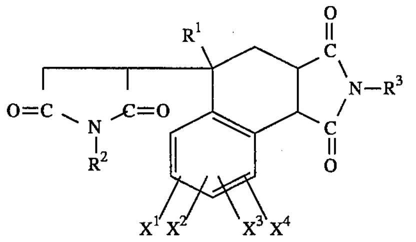

(I)

[In the formula, $R^1$ denotes a hydrogen atom or an alkyl group having a carbon number of 1 to 6; $R^2$ and $R^3$ denote independently each other a hydrogen atom, an alkyl group, a cycloalkyl group, an aryl group, or a substituted aryl group; $X^1$, $X^2$, $X^3$ and $X^4$ denote independently each other a hydrogen atom, an alkyl group, or a hydroxyl group.]

To attain the forementioned objects, in the process for producing a maleimide-based copolymer which comprises the aromatic vinyl-based monomer unit (A) and the maleimide-based monomer (B) as essential composing units by undergoing a radical polymerization reaction between the aromatic vinyl-based monomer (a) and the maleimide-based monomer (b) in a reaction vessel;

there is provided in this invention a process for producing a maleimide-based copolymer, which is characterized in that a polymerization reaction is carried out by supplying gradually the monomers (a) and (b) to a reaction vessel under a condition of separating the monomers without mixing together beforehand.

According to the production process of the present invention, there can be obtained a maleimide-based copolymer, which has the aromatic vinyl-based monomer unit (A) and the maleimide-based monomer unit (B) as essential composing units, has proportion y of -the maleimide-based monomer unit (B) in structure in a range of from 35 to 65% by weight, has volatile components in a content of 1,000 ppm or less because volatile components are removed, after the polymerization reaction, from a reaction solution containing the copolymer, and has the compound (X) shown by the above-described general formula (I) in a content x of 3% by weight or less and also, in a content not exceeding a numeral value of 0.06y.

According to the production process of this invention, another monomer (c) capable of copolymerizing with the monomers (a) and (b) can be copolymerized.

To solve the above-described objects, the present invention provides a thermoplastic resin composition which contains a maleimide-based copolymer of this invention and a thermoplastic resin other than the maleimide-based copolymer as main components.

The maleimide-based copolymer has the aromatic vinyl-based monomer unit (A) and maleimide-based monomer unit (B) as essential composing units and has a structure made by combining regularly or irregularly with the other monomer units (C) contained if required. In this invention, it is preferred that the maleimide-based copolymer has a weight-average molecular weight in a ravage of from 50,000 to 500,000 and, still preferred that it has the molecular weight in a range of from 50,000 to 300,000. The forementioned weight-average molecular weight is measured according to a procedure in the undermentioned examples. The monomer units (A), (B) and (C) are derived from respective monomers (a), (b) and (c).

It is necessary to have proportion y of the monomer unit (B) in the maleimide-based copolymer structure in a range of from 35 to 65% by weight and a preferable range is from 40 to 65% by weight. When the proportion of monomer unit (B) is in the range, the copolymer is superior in heat resistance and thermal stability and useful as a resin improver, but if it is lower than tile range, the copolymer can not give sufficient heat resistance to a resin composition and, if it exceeds the range, the processing property of a copolymer is bad and also, impact resistance is inferior.

A preferable proportion of the monomer unit (A) in the maleimide-based copolymer structure is ill a range of from 35 to 65% by weight and a more preferable one is in a range of from 35 to 60% by weight. When in the range, the processing property, moisture absorption property and impact resistance are excellent, but if it is lower than the range, the processing property or impact resistance is low and, if it exceeds the range, the heat resistance is low and also, when combined with a thermoplastic resin, there is a case of low compatibility.

The proportion of monomer unit (C) in the maleimide-based copolymer structure is in a range of from 0 to 30% by weight and a preferable proportion is in a range of 0 to 25% by weight. If the proportion is less than the range, it is possible to afford a character such as the reactivity, compatibility, or solvent resistance, but if it exceeds the range, balancing between the processing property, impact resistance, or heat resistance is hard to get.

The maleimide-based copolymer of the present invention is such that the content x of the compound (X) is 3% by weight or less and also, it does not exceed a numeral value of 0.06y. A preferable polymer is such that the content x does not exceed a numeral value of 0.06y–1. This fact suggests that, as the content of maleimide-based monomer (B) increases, the compound (X) is more liable to form and, therefore, it is necessary to maintain an amount compound (X) at a proportion less than a specific proportion against the content y of monomer (B). When the content x of compound (X) satisfies the relations, $x \leqq 0.06$ y and $x \leqq$: 3, the maleimide-based copolymer has a high proportion of the maleimide-based monomer unit (B) in structure such as a percent in a range of from 35.0 to 65.0% by weight and thus, it is useful for a resin improver and becomes superior in balancing of physical properties. If it does not satisfy the relations, the heat resistance and impact resistance much decreases by a decrease in proportion of the copolymer-constituting maleimide-based monomer unit (B) elevating heat resistance in the whole maleimide-based monomer (b) as well as by an effect of the compound (X) derived from the maleimide-based monomer (b).

In the maleimide-based copolymer of this invention, a total amount of the volatile components must be 1,000 ppm or less. In a case where the volatile components is contained over 1,000 ppm, the copolymer is inferior in heat resistance and, when molding is carried out with this copolymer, silver streak occurs, so that good moldings are not obtained. The volatile components are, for example, monomers and organic solvents used in the polymerization reaction.

Since a process for producing the maleimide-based copolymer of this invention is possible to depress a forming amount of the compound (X) in the course of polymerization, when the production process of this invention is performed, it is unnecessary to employ a purification process to remove the compound (X), in which a solvent other than the solvent used in the course of a polymerization reaction is used to repeat dissolving and precipitating. Thus, according to this production process, a copolymer of this invention superior in heat resistance, impact resistance and processing property can be obtained with high efficiency.

The monomer (a) used in this invention is a compound represented by the following formula ①:

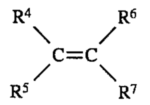

①

[In the formula, $R^4$, $R^5$ and $R^6$ denote independently a hydrogen atom or an alkyl group having a carbon atom number of from 1 to 5, and $R^7$ denotes an aryl group or a substituted aryl group.]

Preferable examples are, for example, styrene; an alkylstyrenes such as o-methylstyrene, m-methylstyrene, p-methylstyrene (these methylstyrenes can be said as vinyltoluenes), 1,3-dimethylstyrene, 2,4-dimethylstyrene, ethylstyrene, and p-tertiary-butylstyrene; α-methylstyrene, α-ethylstyrene, and α-methyl-p-methystyrene; vinylnaphthalene; halogenated styrenes such as o-chlorostyrene, m-chlorostyrene, p-chlorostyrene, and 2,4-dibromostyrene; halogenareal alkylstyrene such as 2-methyl-4-chlorostyrene; and the like. One kind or two or more kinds in combination of these compounds can be used. From a standpoint of balancing between productivity and properties, it is hoped to use at least one kind selected from a group consisting of styrene, vinyltoluene, and α-methylstyrene. Besides, if an aliphatic vinyl-based monomer is used instead of the aromatic vinyl-based monomer, the monomer reactivity is low, and an obtained copolymer shows low heat resistance and it is highly hygroscopic.

The maleimide-based monomer (b) used in this invention is a compound represented by the formula ②.

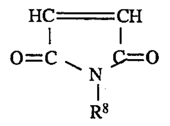

②

[In the formula, $R^8$ denotes a hydrogen atom, or an alkyl, a cycloalkyl, a substituted alkyl, an aryl or a substituted aryl group having a carbon atom number of from 1 to 15.]

Preferable examples are, for example, maleimide, N-methylmaleimide, N-ethylmaleimide, N-propylmaleimide, N-isopropylmaleimide, N-butylmaleimide, N-isobutylmaleimide, N-tertiary-butylmaleimide, N-cyclohexylmaleimide (hereinafter, which may be referred to as "CHMI"), N-phenylmaleimide (hereinafter, which may be referred to as "PMI"), N-chlorophenylmaleimide, N-methylphenylmaleimide, N-bromophenylmaleimide , N-naphthylmaleimide , N-laurylmaleimide, 2-hydroxyethylmaleimide, N-hydroxyphenylmaleimide, N-methoxyphenylmaleimide, N-carboxyphenylmaleimide, N-nitrophenylmaleimide, and the like. One kind or two or more kinds in combination of these compounds can be used.

Especially, to use either one or both of phenylmaleic imde and cyclohexylmaleimide is preferred, because commercial availability is good and a copolymer superior in heat resistance is obtained.

The monomer (c) is a compound having an ethylenic unsaturated bond except the aromatic vinyl-based monomer (a) and maleimide-based monomer (b) and it is used to elevate impact resistance, solvent resistance and compatibility. Preferable monomers (c) are, for example, unsaturated nitiles such as acrylonitrile (hereinafter, which may be referred to as "AN"), methacrylonitrile, ethacrylonitrile and phenylacrylonitrile; (meth) acrylic acid esters having an alkyl group of carbon number 1 to 18 including a cycloalkyl group and a benzyl group [for example, methyl (meth) acrylate, ethyl (meth) acrylate, butyl (meth) acrylate, isobutyl (meth) acrylate, tertiary-butyl (meth) acrylate, amyl (meth) acrylate, isoamyl (meth) acrylate, octyl (meth) acrylate, 2-ethylhexyl (meth) acrylate, decyl (meth) acrylate, lauryl (meth) acrylate, cyclohexyl (meth) acrylate, benzyl (meth) acrylate and the like], hydroxyethyl (meth) acrylate, hydroxypropyl (meth) acrylate, polyethylene glycol mono (meth) acrylate; olefins such as ethylene, propylene, isobutylene, diisobutylene and the like; dienes such as butadiene, isoprene and the like; vinyl halogenides such as vinyl chloride, vinylidene chloride, vinyl bromide, vinyl fluoride and the like; vinyl ethers such as methyl vinyl ether, butyl vinyl ether and the like; vinyl esters of saturated aliphatic monocarxylic acids such as vinyl acetate, vinyl propionate and the like; allyl or methallyl esters of saturated aliphatic monocarxylic acids such as ally allyl acetate, allyl propionate and the like; polyvalent (meth) acrylates such as ethylene glycol di(meth)acrylate, diethylene glycol di(meth) acrylate, divinyl benezene, diallyl phthalate, trimethylolpropane tri(meth) acrylate, pentaerythritol tetra(meth) acrylate, dipentaerythritol hexa(meth) acrylate, di(meth) acrylates of addition compounds of bisphenol A with ethylene oxide or propylene oxide, di(meth) acrylates of addition compounds of halogenated bisphenol A with ethylene oxide or propylene oxide, di(meth)acrylate of isocyanulate, di- or tri (meth) acrylates of addition compounds of isocyanulate with ethylene oxide or propylene oxide and allylate such as triallyl isocyanulate and the like; glycidyl (meth) acrylate, allyl glycidyl ether, (meth) acrylic acid, itaconic acid, maleic acid, fumalic acid, or half esters of these acids and the like. According to a purpose, one kind or two or more kinds in combination are used, but the kind and amount for use may be chosen in a range which does not deviate from a purpose of this invention.

To obtain a maleimide-based copolymer having the proportion of maleimide-based monomer unit (B) in structure in a range of from 35 to 65% by weight, a preferable amount for use of the maleimide-based monomer (b) is in a range of from 30 to 60% by weight.

A preferable amount for use of the monomer (c) is in a range of from 0 to 30% by weight and a more preferable amount is in a range of from 0 to 20% by weight. The total amount for use of the monomers (a), (b) and (c) is 100% by weight.

If an amount for use of the monomer (b) is more than the above range, a molding processing property of a maleimide-based copolymer formed may become bad and impact resistance of the copolymer may lower. If an amount for use of the monomer (b) is less than the above range, a maleimide-based copolymer may not be able to give a resin composition sufficient heat resistance.

If an amount for use of the monomer (c) is more than the above range, balancing of properties in a molding processing property, impact resistance, or the like of a maleimide-based copolymer formed may be barely obtained.

In the production process of this invention, the monomers (a) and (b) are subjected to a polymerization reaction by suppling gradually to a reaction vessel under a condition of keeping these monomers separated without mixing together beforehand. That is, the polymerization reaction is carried out by charging a part of the monomer (a) into a reaction vessel and then, supplying gradually a residual amount of the monomer (a) and a total amount of the monomer (b) to the reaction vessel under a condition of separating these monomers without mixing together beforehand; or by charging a part of the monomer (b) into a reaction vessel and then, supplying gradually a total amount of monomer (a) and a residual amount of the monomer (b) to the reaction vessel under a condition of keeping these monomers separated without mixing together beforehand; or charging a solvent to a reaction vessel and then, supplying gradually a respective total amount of monomers (a) and (b) to the reaction vessel under a condition of keeping these monomers separated without mixing together beforehand. The reason for supplying the monomers gradually to a reaction vessel is to minimize variation in a concentration ratio between each monomer in the vessel, to make the component distribution of forming copolymers small, and thereby to elevate balancing of properties. Doing like this, a maleimide-based copolymer is formed by continuing the monomer supply. Here, the method of supplying the monomer is not especially limited, and there is adopted a procedure such as dropping at uniform velocity or controlling the dropping velocity by monitoring the monomer composition.

It is preferred that a part of the total amount of the forementioned monomer is in range of from 10 to 80% by weight and more preferred that the part is in a range of from 10 to 50% by weight. If the part is in the range, a concentration of the monomer (a) in the reaction vessel does not become too high, so that the formation rate of the compound (X) can be depressed in a specific range, but if lower than the range, the polymerization rate becomes slow and, thus, productivity becomes low and the content x of compound (X) in the maleimide-based copolymer may increases. If it exceeds the range, although the proportion of monomer unit in the copolymer structure can be controlled by speeding up the supplying rate of the maleimide-based monomer (b), huge cooling capacity becomes necessary in order to control an increasing polymerization rate and depress occuring heat generation as well as an amount of unfavorable, but forming compound (X) may increase.

Supply of the monomer (c) may be carried out by supplying gradually-the monomers (a) or (b) under a condition of separating these monomers each other, by mixing the monomers (a) and (b) followed by supplying, or by charging a part of the total monomer (c) into a reaction vessel followed by supplying gradually the residual amount and, there is no limitation . As usual, if allocation between a part initially charged and a part gradually supplied is set considering copolymerization reactivity of the monomer (c), this monomer unit exists uniformly in the copolymer structure.

In a case where a monomer is a liquid, the monomer may be charged into a reaction vessel, it may be gradually supplied to the vessel, or it may be supplied by dissolving it into an organic solvent. If the monomer (b) is a solid at normal temperature, according to necessity, it is melted or dissolved into an organic solvent and then, it is preferred to supply gradually the monomer (b) without mixing with the monomer (a) under a condition of maintaining temperature in a preferred range of from 40° to 120° C. or in a still preferred range of from 50° to 100° C. and maintaining concentration of the monomer (b) in a range of from 40 to 100% by weight. If lower than the forementioned range, solubility into an organic solvent may be too low and, if it is over the range, the storage property and stability may become bad.

When the organic solvent is used, a preferable range for use is from 30 to 70% by weight against the total weight amount of used materials.

The solvent should be capable of dissolving the monomer may be, for example, an aromatic solvent such as toluene (hereinafter, which may be referred to as "Tol"), benzene and the like; a ketone such as methyl ethyl ketone (MEK), methyl isobutyl ketone, cyclohexanone and the like; an ester such as ethyl acetate and the like; a halogenated hydrocarbon such as chloroform and the like; dimethyl formamide; dimethyl acetoamide; and an organic solvent having a polar character such as dimethyl sulfoxide and the like. Considering economical advantage and facility in handling at normal temperature, toluene and methyl ethyl ketone are preferable. A solvent having a boiling point in a range of from 60° to 140° C. is preferable, because it is hard to remain as a volatile component in a copolymer.

It is preferred that the solvent is used so as to have a weight ratio in a range of from 0.6 to 0.98 against a total amount 1.00 of the solvent and monomer (a). Because, the range of solvent use is very proper to obtain a maleimide-based copolymer having a ratio of the maleimide-based monomer unit (B) in structure in a range of from 35 to 65% by weight and also, the use is very appropriate to depress formation of the compound (X). If the weight ratio of a solvent to a total amount of this solvent and the monomer (a) is lower than 0.6, solution viscosity of the reaction mixture may rise or composition distribution may become broad by occurrence of a bad stirring condition. If it is over 0.98, the reaction rate may decrease due decrease in the proportion of monomer (a).

The composition of a maleimide-based copolymer is determined by the mole ratio between monomers, (b) to (a), in the reaction mixture. That is, as this mole between the monomers increases, a maleimide-based copolymer having a higher content of the maleimide-based monomer unit (B) is formed. Therefore, in a case of producing a copolymer having a large content of the monomer unit (B), a residual amount of the monomer (b) increases. In a case like this, it is recommended to decrease a residual amount of the monomer (b) at an end point of supplying the monomer by using a solvent in a large amount.

In the present invention, a polymerization initiator or a chain-transfer agent may exist in the reaction mixture. Preferable polymerization initiators are, for example, peroxides such as 1,1-bis(tertiary-butylperoxy) 3,3,5-trimethylcyclohexane, di-tertiary-butylperoxide, benzoylperoxide, lauroylperoxide, tertiary-butylperoxy acetate, tertiary-butylperoxy isobutylate, tertiary-butylperoxy pivalate, tertiary-butylperoxy 2-ethylhexanoate, tertiary-butylperoxy laurate, tertiary-butylperoxy benzoate, tertiary-butylperoxy isopropylcarbonate and the like; azo compounds such as azobis(isobutyronitrile), azobis (dimethylvaleronitrile), azobis(1-cyclohexanecarbonitrile) and the like; and therefore, it is said that a compound commonly used in the radical polymerization reaction is used in a common amount for use. The polymerization initiator may be used by charging the whole amount beforehand in the reaction vessel or may be by supplying it during the reaction.

In this invention, the polymerization is carried out by eliminating oxygen dissolved in the reaction mixture by introducing an inert gas in the course of reaction. This is because oxygen acts as a polymerization inhibitor.

The polymerization is carried out at a temperature in a range of from 60° to 200° C. for a period of from 1 to 20 hours. A preferable polymerization-conversion is, for example, in a range of from 50 to g5% by weight against the total amount of used monomers. After all the monomers were gradually supplied, if necessary, the polymerization reaction may be continued at the same temperature and the same atmosphere or charging properly at least one of these.

Since, in a reaction mixture containing the maleimide-based monomer obtained from a reaction described above, the proportion of compound (X) shown by the forementioned formula (I) against the maleimide-based copolymer is smaller than that in the case of hitherto-known conventional maleimide-based copolymers, when the reaction finished, the reaction mixture is poured into a solvent such as methanol to precipitate a polymer, which is separated from the solution by filtering, etc. and treated by drying under vacuum to remove volatile components such as a solvent and unreacted monomer and so forth, whereby a maleimide-based copolymer is obtained, otherwise treating of the reaction mixture to remove volatile components using a vent type twin screw extruder is more effective and thereby, a maleimide-based copolymer superior in heat resistance and impact resistance can be obtained.

In the present invention, to decrease the content of a residual maleimide-based monomer sufficiently at the end of a polymerization reaction, to prevent a fall of heat resistance, coloring of moldings and pollution of a metal mold resulting from a residual of the maleimide-based monomer, and to make composition distribution of a copolymer narrow as well, it is preferred that, in a process for producing a maleimide-based copolymer which comprises charging, into a reaction system, at least a part of monomer members consisting of the aromatic vinyl-based monomer (a), maleimide-based monomer (b) and another vinyl-based monomer (c) capable of copolymerizing with the former two monomers, and supplying gradually a residual part of the monomer members to undergo a copolymerization reaction, a maleimide-based copolymer is prepared by adding a polymerization inhibitor into the reaction system after completion of supplying of all the residual monomers to the reaction system and then, by carrying out a maturing reaction to depress a polymerization reaction of the monomer (a) and to decrease a residual amount of the monomer (b).

The maturing reaction performed after finishing the supply of all the monomers in this invention is carried out by adding a polymerization inhibitor in the reaction system. This maturing reaction is to minimize a residual amount of the monomer (b) by depressing a polymerization reaction of the monomer (a). It is especially preferred that the residual amount of the maleimide-based monomer (b) is one-tenth or less of an amount in a case where the maturing is not carried out, for example, it is 0.1% by weight or less of a residual amount of the monomer (b). If the residual amount of monomer (b) is more than 0.1% by weight, it is afraid that the maleimide-based copolymer is easily colored.

In order to obtain a maleimide-based copolymer having a high content of the maleimide-based monomer unit in the molecular structure, an amount of the maleimide-based monomer remaining in the reaction system is liable to increase. The present invention is especially useful in this case.

Preferable polymerization inhibitors used in this invention are, for example, diphenylpicrylhydrazine, di-p-fluorophenylamine, tri-p-nitrophenylmethyl, p-benzoquinone, methyl-p-benzoquinone, 2,5-dimethyl-p-benzoquinone, methoxy-p-benzoquinone, chloranil, p-tertiary-butylcatechol, 3-phenylcatechol, hydroquinone, m-dinitrobenzene, p-phenyldiamine, 2,5-di-tertiary-butylhydroquinone, dichloronitrophenol, hydroquinone monomethyl ether and the like. These compounds are used alone, or two or more kinds in combination are used. A preferable addition amount of the polymerization inhibitor is, for example, in a range of from 0.001 to 1 part by weight against 100 parts by weight of a monomer remaining at a supply end of the gradually supplied monomer, and a more preferable amount is in a range of from 0.002 to 0.5 parts by weight. If it is in a small amount deviating from this range, the effect of this invention is not sufficiently obtained and, if it is too much, it is afraid that the inhibitor becomes an origin of coloring.

A temperature to carry out the maturing reaction is, for example, in a range of from 80° to 180° C. and, preferably, the maturing is carried out at a temperature similar to that of the polymerization reaction. If the reaction temperature is higher than the range, a different reaction such as a thermal polymerization reaction and the like proceeds, so that adding an extra amount of the polymerization inhibitor is necessary to prevent the different reaction and there is a case where product properties are badly affected. If the reaction temperature is lower than the range, decrease of the maleimide-based monomer (b) takes time, the residual amount increases, viscosity of the polymer solution increases, and operation becomes difficult. A preferable time to carry out the maturing reaction is, for example, in a range of from 10 minutes to 10 hours and, a more preferable time is in a range of from 15 minutes to 5 hours. If the time deviates from this range, the effect of this invention is not sufficiently displayed.

It is known that the catechols and hydroquinones used as a polymerization inhibitor for styrene, phenylmaleimide and the like reveal a sufficient polymerization-inhibiting effect under the coexistence of oxygen and, therefore, the catechols are especially preferable to decrease coloring. Because of this, in this invention, it is preferred to carry out the maturing reaction under the oxygen existence and, with respect to oxygen at this time, it is preferred that the oxygen concentration in a gas phase is in a range of from 0.1 to 10% by volume, and it is further preferred that it is in a range of from 0.3 to 5% by volume. If the oxygen concentration is too low, an effect to depress polymerization of the monomer (a) may be small and, if it is too high, dangerous properties such as an ignitability with a solvent and explosion increases. Although only molecular oxygen may be supplied as the oxygen, a mixed gas containing molecular oxygen such as air etc. may be supplied. Usually, a mixed gas of nitrogen and air is used to supply oxygen by bubbling it in a polymerization solution.

The maleimide-based copolymer produced as the above-mentioned is, in a preferable case, composed of 35 to 65% by weight of the aromatic vinyl-based monomer unit (A), 35 to 65% by weight of the maleimide-based monomer unit (B), and 0 to 30% by weight of the other monomer unit (C), and the volatile components are 1,000 ppm or less, and the content of compound (x) is 3% by weight or less and does not exceed a numeral value of 0.06y. Arrangement of the aromatic vinyl-based monomer unit (A), maleimide-based monomer unit (B) and the other monomer unit (C) may be random or may have a block part.

The maleimide-based copolymer obtained from the production process of this invention has physical properties such as a weight average molecular weight in a range of from 50,000 to 500,000, a number average molecular weight in a range of from 20,000 to 300,000, viscosity at a temperature of 260° C. in a range of from 10,000 to 10,000,000 poise, and a glass transition temperature in a range of 150° to 230° C.

In order that the maleimide-based copolymer of this invention is superior in heat resistance and impact resistance and excellent in melting and molding properties, favorable conditions are that it is composed of 80.0 to 40.0% by weight of the aromatic vinyl-based monomer unit (A), 35.0 to 60% by weight of the maleimide-based monomer unit (B), and 0 to 30.0% by weight of the unit (C) of a monomer capable of copolymerizing with the above monomers (here, the total of A, B and C is 100.0% by weight) and it contains, in an amount of 95% by weight or more, a molecule having a content of the maleimide-based monomer unit (B) within 10% above and lower than an average value.

A maleimide-based copolymer of this type is prepared by undergoing a polymerization reaction which is carried out by charging the aromatic vinyl-based monomer in an amount of from 10 to 80% by weight of the total beforehand into a reaction system and supplying gradually a total amount of the maleimide-based monomer and a residual amount of the aromatic vinyl-based monomer into the reaction system so that a mole ratio of the aromatic vinyl-based monomer to the maleimide-based monomer in the reaction system is, after initiation of the polymerization reaction, in a range of from 2 to 200 and also, the ratio is maintained within 20% above and lower than an expected value.

It is preferred that the maleimide-based copolymer of this invention contains, in an amount of 95% by weight or more, a molecule having a content of the maleimide-based monomer unit (B) within 10% above and lower than an average value. If it is less than 95% by weight, there are cases where the heat resistance, impact resistance and molding property are not all satisfactory. Although the content of a specific molecule of this type may be directly measured, or indirectly measured as the undermentioned. For example, a maleimide-based copolymer obtained by supplying gradually a total amount of the maleimide-based monomer and a residual amount of the aromatic vinyl-based monomer to a reaction system in the following way can be regarded as a copolymer containing 95% by weight or more of a molecule, in which a content of the maleimide-based monomer unit (B) is within 10% above and lower than an average value. The above supplying way is carried out, either by measuring, after a copolymer initiated a polymerization reaction, at every minute time interval in the course of from reaching a stationary state until a polymerization end, a mole ratio between the aromatic vinyl-based monomer and the maleimide-based monomer and, thereby, by controlling the mole ratio at every time interval within 10% above and lower than an expected value; or by measuring, at the time interval as described above, a content of the maleimide-based monomer unit (B) in a formed copolymer and, thereby, by controlling the content of the maleimide-based monomer unit (B) at the time interval in a range of from 35.0 to 60% by weight and also, within 10% above and lower than an average value.

In a case where a maleimide-based copolymer having a content of the maleimide-based monomer unit (B) in a range of from 35.0 to 60.0% by weight is prepared, it is preferred to operate so as to control the mole ratio between the aromatic vinyl-based monomer and the maleimide-based monomer in a range of from 2 to 200 and to maintain this ratio within 10% above and lower than an expected value. Here, although the minute time interval, for example, a time to form 1% of the maleimide-based copolymer is different depending upon reaction conditions, it is usually about 0.5 to 5 minutes. Although it is enough if the composition variation is checked at this time interval, because in this invention the reaction conditions can be set so as to maintain the concentration ratio off monomers and polymerization temperature at invariable values, the time interval can be replaced by a 0.5 to 1. hour interval. Thus, once the reaction conditions are set with this time interval, even if the content percentage is not measured at every time, it is allowed to carry out a reaction so as to maintain the set reaction conditions. A molecule which exists in only an amount of less than 5% by weight in a copolymer is allowed, in the content percentage of the maleimide-based monomer unit (B), to deviate from the range of 10% above arid lower than an average value, Here, the gradual supplying means, for example, not to supply the total of a supplying material at one time, but to supply continuously or intermittently and, it means usually dropping.

A maleimide-based copolymer has generally physical properties such as a weight average molecular weight of 50,000 to 1,000,000, a number average molecular weight of 20,000 to 300,000, viscosity at 260° C. of 10,000 to 10,000, 000 poise, a glass transition temperature in a range of from 160° to 210° C. and a glass transition temperature width of from 5° to 15° C. The glass transition temperature width is defined, for example, as follows. A glass transition temperature (Tg) of a copolymer is measured by DSC differential scanning calorimetry). As seen in FIG. 3, two base lines (which may be parallel or may not be parallel) are given by transferring the base lines (D and E) on the differential thermal curve at before and behind Tg, a tangential straight line is taken at a middle point on the thermal curve between the two base lines, the points where this tangential straight line crosses the two base lines are assigned as the temperatures, $Tg_1$ and $Tg_2$ (°C.) (here, $Tg_1>Tg_2$), and thus, the glass transition-temperature width can be obtained as $Tg_1-Tg_2$ (°C.). In these physical properties, that the glass transition temperature width is narrow as described above shows a very narrow composition distribution which the maleimide-based copolymer of this invention has, when compared with hitherto-known copolymers.

In this invention, to prepare a maleimide-based copolymer having a narrow composition distribution as described above, the polymerization reaction is carried out as follows. At first, 10 to 80% by weight of the total amount of the aromatic vinyl-based monomer (a) is charged in a reaction system such as a reaction vessel, etc. Then, into this reaction system, the total maleimide-based monomer (b) and the residual aromatic vinyl-based monomer (a) are gradually supplied. This supply is carried out so as to maintain a mole ratio of the aromatic vinyl-based monomer (a) to the maleimide-based monomer (b) in the reaction system is maintained in a range of from 2 to 200 and also, to be always within 20% over or less than an expected value. By these, a desired maleimide-based copolymer is obtained. Although the mole ratio of (a) to (b) and the composition of an obtained copolymer differ each other because of difference in copolymerization reactivities of the aromatic vinyl-based monomer (a) and the maleimide-based monomer (b) under reaction conditions, in a case where the mole ratio of (a) and (b) is less than 2, an alternating copolymer is easy to obtain, and if it exceeds 200, a content of the maleimide-based monomer (b becomes too low, so that a desire copolymer is not obtained. In a case where an amount of the aromatic vinyl-based monomer (a) charged in the reaction system before initiation of the polymerization is less than 10% by weight of the total amount, because the proportion of unreacted aromatic vinyl-based monomer (a) is too low, the mole ratio of (a) to (b) becomes easily less than 2.

As an amount of the aromatic vinyl-based monomer (a) charging at an initial stage increases, the unreacted aromatic vinyl-based monomer (a) concentration in the reaction system becomes high and, therefore, it is possible to operate so as to maintain the mole ratio of (a) to (b) at 200 or less. However, in a case where an amount of the aromatic vinyl-based monomer (a) charging at an initial stage becomes over 80% by weight of the total, the proportion of maleimide-based monomer (b) in a dropping solution becomes too large and supplying velocity of the maleimide-based monomer (b) becomes too fast, a heat amount generating at an initial stage of the polymerization becomes large. Because of this, in an industrial production, very large cooling capacity becomes necessary and also, temperature control of an interior of the reaction system at a polymerization-initial point becomes difficult.

In a polymerization process of the production process of this invention, the mole ratio of (a) to (b) is controlled, as described above, so as to be in a range of from 2 to 200 at every minute time interval and to be within 20% above and lower than an expected value in all the reaction period of after initiation of the polymerization, in another words, in all the reaction course of after reaching a stationary state to an end of the polymerization. If it exceeds 20%, the composition of a copolymer obtained varies with time passage, the composition distribution and molecular weight distribution become broad, and the heat resistance, molding property and impact resistance become low.

The forementioned stationary state is referred to a time point that, after the polymerization reaction initiated, the maleimide-based monomer concentration in the reaction system gradually increases and the concentration variation shows an almost invariable trend, or it is more appropriately referred to a time point that the maleimide-based monomer concentration maintains an almost constant value. Accordingly, in the present invention, the composition of a forming copolymer is analyzed by sampling at the minute time intervals as mentioned above and then, a time reaching a value of ±10% from a mean value is a time point of the stationary state. Although this time point is different depending upon reaction conditions, it is, for example, a time showing the polymerization-conversion in a range of from 2 to 5% after a monomer supply was initiated by dropping etc.

In this invention, it is preferred that the polymerization is carried out in the presence of an organic solvent in a reaction system under a boiling condition and the reaction temperature in the reaction system under the condition is controlled within 2° C. above or lower than an expected value. For example, it is possible to control a dropping velocity of at least one of the aromatic vinyl-based monomer, organic solvent, and maleimide-based monomer by monitoring the temperature in the reaction system. It is possible to maintain the boiling condition by changing pressure in the reaction system. Also, heat removal becomes easy and a reaction which is out of expectation and cannot be controlled is prevented, Here, the boiling point denotes a boiling point of the mixture in the reaction system and, since the aromatic vinyl-based monomer and an organic solvent used in case of need exist in an overwhelmingly large amount, it is regarded as an azeotropic point of the aromatic vinyl-based monomer and the organic solvent.

An expected value in this invention of the mole ratio of (a) to (b) can be conjuctured beforehand from a copolymerizing ability ratio between the maleimide-based monomer and each monomer, but it is preferred to confirm the value in each of the polymerization conditions.

In the reaction system, only the aromatic vinyl-based monomer may be charged and, if required, the aromatic vinyl-based monomer and organic solvent may be charged. In this case, an amount of the organic solvent is, for example, in a range of from 0.5 to 20 times against all weight amount of the aromatic vinyl-based monomer.

Also, since the maleimide-based copolymer obtained from this invention shows high heat resistance as well as a superior molding property (fluidity), it can be used as a resin composition by kneading with other one or more kinds of thermoplastic resins. For example, the heat resistance is elevated if the copolymer is used as an improver for a methylmethacrylate resin, mehhylmethacrylate-styrene resin, polycarbonate resin, polyethylene terephthalate resin, polybutylene terephthalate resin, polyphenylene oxide resin, vinyl chloride resin, chlorinated vinyl chloride resin, an acrylonitrile-styrene resin, acrylonitrile-methylmethacrylate resin, a styrene-methacrylic acid resin, styrene-methacrylic acid-acrylonitrile resin, unsaturated polyester resin and the like. Especially, the maleimide-based copolymer is superior in miscibility with a rubber-modified resin represented by an ABS resin (a acrylonitrile-butadiene-styrene resin) and a MBS resin (a methylmethacrylate-butadiene-styrene resin), and with a crystalline resin such as a polyamide resin, polyethylene terephthalate resin, polybutylene terephthalate resin and the like. If the maleimide-based copolymer is blended in the proportion that a weight ratio of said resins to the maleimide-based copolymer is usually in a range of from 10: 90 to 90:10 under a common operation condition using a device such as a twin screw extruder or the like, heat resistance is elevated without damaging the feature of these resins and a resin composition superior in molding and processing properties is obtained.

In addition to the maleimide-based copolymer and other thermoplastic resins, the above-described resin composition can be used, if required, by combining a hindered phenol-based oxidation inhibitor or a phosphite-based stabilizer to improve thermal stability, by combining a benzophenone-based or hindered amine-based ultraviolet ray absorbent to improve weather resistance, and by combining an amide-based lubricant or metallic soap to improve molding and processing properties. Furthermore, an inorganic filler such as calcium carbonate, calcium sulfate, talc, mica, bentonite, glass fiber and the like, and an additive such as a fire retardant, an antistatic agent, a colorant and the like can be combined. These agents can be contained alone or in two or more kinds in combination. The content of these agents are properly determined according to a requirement.

The above-described resin composition can give specific moldings by a molding method such as injection molding, extruding molding and vacuum molding and so forth. For example, they are used for automobile interior decoration articles such as a console box, speaker box, all instrument panel and so forth, automobile outside decoration articles such as a wheel cover, an air spoiler and so forth, an electric and electronic articles such as housing of a word processor, a personal computer and so forth.

In a maleimide-based copolymer, wherein the aromatic vinyl-based monomer unit (A) and maleimide-based monomer unit (B) are included as essential components, proportion y of the maleimic-based monomer unit (B) in structure is in a range of from 35 to 65% by weight, the content of volatile components is 1,000 ppm or less, because the content x of the compound (X) is kept at 3% by weight or less and does not exceed a numeral value of 0.06y;

decrease of heat resistance and impact resistance resulting from the compound (X) can be prevented.

A maleimide-based copolymer containing only a small amount of the compound (X) can be obtained by maintaining the monomers (a) and (b) under a condition of separating these monomers without mixing together beforehand and by supplying gradually those into a reaction vessel to carry out a radical copolymerization reaction.

A thermoplastic resin composition, in which the heat resistance, molding property and impact resistance are all improved, is obtained if a maleimide-based copolymer, wherein proportion y of the maleimide-based monomer unit B) is in a range of from 35 to 65% by weight, the content of volatile components is 1,000 ppm or less, and the content of compound (X) is 3% by weight or less and it does not exceed a numeral value of 0.06y, is used to improve properties of other thermoplastic resins.

A maleimide-based copolymer of this invention is superior in heat resistance and impact resistance, because the content of compound (X) formed via a Diels-Alder type reaction of the maleimide-based monomer with the aromatic vinyl-based monomer is controlled in a range of not giving a bad effect on physical properties of the maleimide-based copolymer.

According to a production process of this invention, since formation of the compound (X) is difficult in a polymerization reaction, a maleimide-based copolymer superior in heat resistance and impact resistance can be prepared directly from the polymerization.

Since a thermoplastic resin composition of this invention contains a maleimide-based copolymer of this invention, it is a resin composition improved in all of the heat resistance, molding property and impact resistance.

DESCRIPTION OF THE PREFERRED EMBODIMENTS

Figure 1:
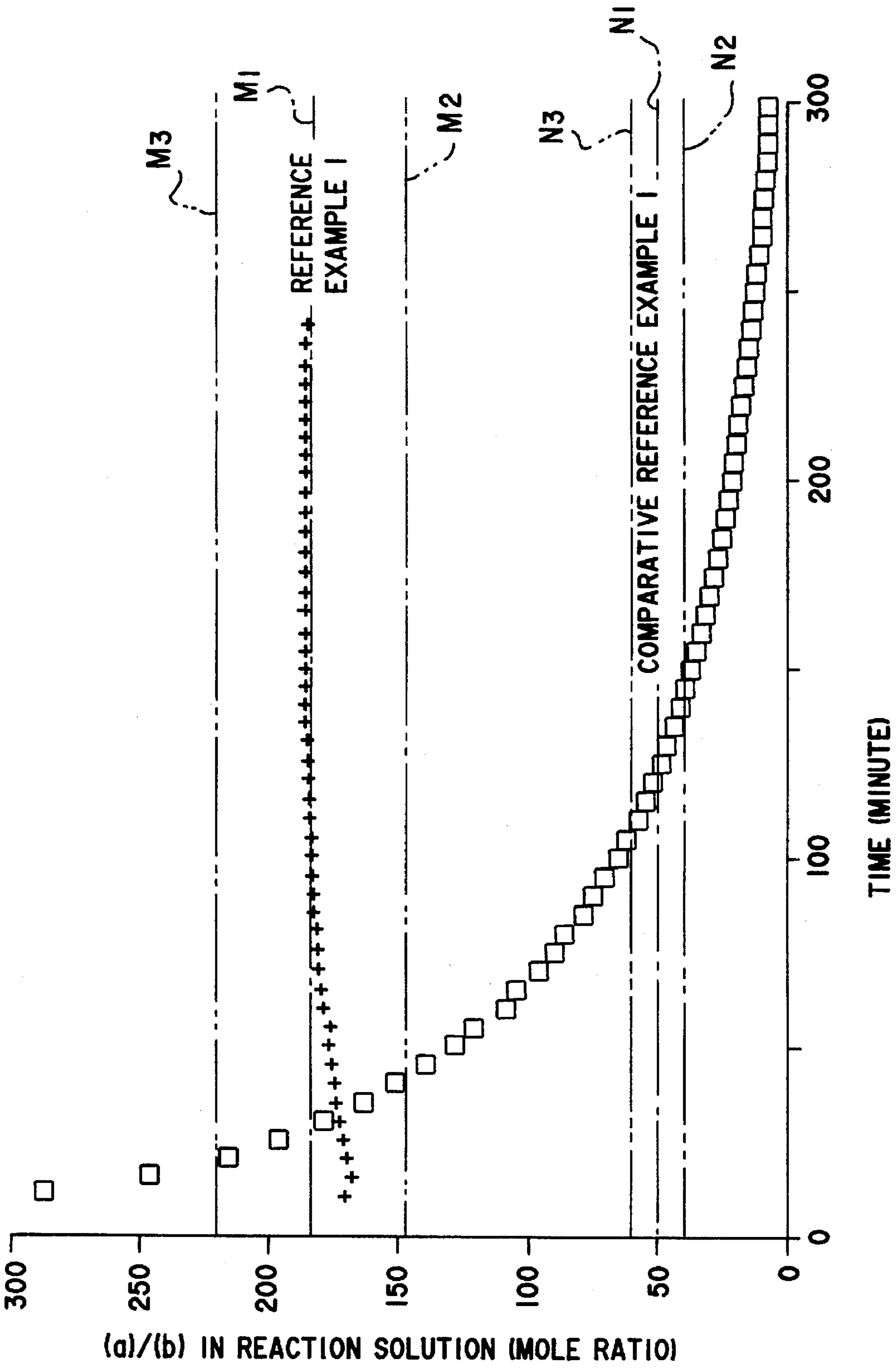
FIG. 1 is a graph showing variation of a mole ratio between the monomers, (a) to (b), in a reaction solution with passage of the polymerization time in the reference example 1 and comparative reference example 1.

Hereinafter, practical examples and comparative examples of the present invention are presented, but the invention is not limited to the following examples. In addition, unless otherwise stated, the "part" is "part by weight" and "%" is "% by weight".

EXAMPLE 1-1

Into a polymerization reaction vessel of interior volume 30 liter equipped with a condenser, stirrer, and two dropping funnels was charged a solution of the monomer (a) made by dissolving 7.2 parts of styrene in 36.5 parts of toluene (which may be referred to as "Tol") and the interior atmosphere was replaced by a nitrogen gas.

On the other hand, into the dropping bath (1) were charged residual 17.5 parts of styrene and 0.02 parts of tertiary-butylperoxy isopropylcarbonate, and into the dropping bath (2) was charged a solution of the monomer (b) made by dissolving 23.3 parts of phenylmaleimide in 15.5 parts of toluene. The dropping bath (2) was maintained at a temperature (here, 60° C.) of making a homogeneous solution by completely dissolving phenylmaleimide in toluene.

A polymerization reaction was initiated by warming up the monomer (a) solution in the polymerization reaction vessel at 115° C. and adding 0.01 part of tertiary-butylperoxy isopropylcarbonate to the monomer solution. To this monomer solution, in which the polymerization was initiated, the total amount of styrene in the dropping bath (1) and the total amount of the phenylmaleimide solution in the dropping bath (2) were dropped from different dropping funnels during 3.5 hours at an uniform velocity to carry out the polymerization reaction. In addition, after the dropping was finished, maturing was carried out by continuing heating for 1.5 hours. Whereby, a reaction solution containing a formed maleimide-based copolymer was obtained.

Then, the reaction solution was leafed beforehand and introduced into a vent type (65 mm in diameter) twin screw extruder, which was operated under conditions of a resin temperature of 270° to 300° C. and a vacuum degree of 20 Torr. Whereby a maleimide-based copolymer was obtained in a pellet form.

EXAMPLES 1-2 TO 1-6 AND COMPARATIVE EXAMPLES 1-1 to 1-3

The procedure of example 1-1 was repeated except that the charging into the polymerization reaction vessel, dropping bath (1) and dropping bath (2), interior temperature of the dropping bath (2) and polymerization temperature were changed as shown in Table 1-1, whereby a maleimide-based copolymer was obtained.

TABLE 1-1

| | | example | | | | | | comparative example | | |
|---|---|---|---|---|---|---|---|---|---|---|
| | | 1-1 | 1-2 | 1-3 | 1-4 | 1-5 | 1-6 | 1-1 | 1-2 | 1-3 |
| material | polymerization bath | | | | | | | | | |
| formulation (part) | St | 7.2 | 3.3 | 10.8 | 47.0 | — | — | 24.7 | 7.2 | — |
| | AN | — | — | — | — | — | — | — | — | — |
| | PMI | — | — | — | — | 7.2 | — | — | — | — |
| | solvent | 36.5 | 39.7 | 34.6 | 28.7 | 36.5 | 11.7 | 36.5 | 36.5 | 11.7 |
| | initiator | 0.01 | 0.01 | 0.01 | 0.01 | 0.01 | 0.01 | 0.01 | 0.01 | 0.01 |
| | dropping bath (1) | | | | | | | | | |
| | St | 17.5 | 15.0 | 18.7 | 11.1 | 15.0 | 49.6 | — | — | — |
| | initiator | 0.02 | 0.02 | 0.02 | 0.02 | 0.02 | 0.02 | 0.02 | 0.02 | 0.02 |
| | dropping bath (2) | | | | | | | | | |
| | St | — | — | — | — | — | — | — | 17.5 | 49.6 |
| | PMI | 23.3 | 25.2 | — | 11.9 | 25.8 | 17.4 | 23.3 | 23.3 | 17.4 |
| | CHMI | — | — | — | 21.5 | — | — | — | — | — |
| | AN | — | — | — | — | — | — | — | — | — |
| | solvent | 15.5 | 16.8 | 14.4 | 1.3 | 15.5 | 21.3 | 15.5 | 15.5 | 21.3 |
| | dissolving temperature (°C.) | 60 | 60 | 60 | 80 | 60 | 40 | N.T. | 60 | 40 |
| polymerization condition | polymerization temperature (°C.) | 115 | 112 | 115 | 120 | 110 | 110 | 115 | 115 | 110 |
| | polymerization time (hour) | 3.5 | 3.5 | 3.5 | 3.5 | 3.5 | 3.5 | 3.5 | 3.5 | 3.5 |
| | maturing time (hour) | 1.5 | 1.5 | 1.5 | 1.5 | 1.5 | 1.5 | 1.5 | 1.5 | 1.5 |
| | solvent | Tol | Tol | Tol | Tol | Tol | Tol | Tol | Tol | Tol |
| | initiator | b | b | b | b | b | b | b | b | |

(footnote): In Table, "b" denotes tertiary-butylperoxy isopropylcarbonate; and "N.T." denotes normal temperature.

In the examples and comparative examples, when the polymerization reactions finished, composition of the reaction mixtures was measured by gas chromatography and results are presented in Table 1-2.

TABLE 1-2

| | example | | | | | | comparative example | | |
|---|---|---|---|---|---|---|---|---|---|
| | 1-1 | 1-2 | 1-3 | 1-4 | 1-5 | 1-6 | 1-1 | 1-2 | 1-3 |
| No. of Copolymer | A-1 | A-2 | A-3 | A-4 | A-5 | A-6 | B-1 | B-2 | B-3 |
| composition of reaction mixture at end of polymerization (%) | | | | | | | | | |
| St | 5.1 | 0.3 | 6.5 | 31.5 | 0.2 | 25.5 | 0.9 | 5.1 | 25.5 |
| PMI | 0.0 | 0.0 | — | 0.1 | 0.1 | 0.1 | 0.1 | 0.0 | 0.1 |
| CHMI | — | — | 0.0 | — | — | — | — | — | — |
| AN | — | — | — | — | — | — | — | — | — |
| solvent | 52.0 | 56.5 | 49.0 | 30.0 | 52.0 | 33.0 | 52.0 | 52.0 | 33.0 |
| maleimide-based copolymer | 42.9 | 43.2 | 42.6 | 38.4 | 47.8 | 41.4 | 47.0 | 42.9 | 41.4 |

Regarding the maleimide-based copolymers finally obtained from the examples and comparative examples, the kind and proportion of monomer units in the copolymer structure, the weight average molecular weight of the copolymers, the content of compound (X), and residual amount of volatile components are presented in Table 1-3.

The kind and proportion of monomer units in the copolymer structure were determined by infrared spectra, $^1$H-NMR spectra and elementary analyses.

The weight average molecular weight of copolymers was determined by that a molecular weight measured by gel permeation chromatography (GPC) using tetrahydrofuran (THF) as an eluate was checked with a standard polystyrene.

The content x (% by weight) of compound (X) was determined by separating the copolymer and compound (X) with GPC and measuring an area ratio of them. The working curve used was prepared by adding a known amount of the compound (X) to the copolymer.

Table 1-3 shows a molecular structure of the corn-poured (x) contained in the maleimide-based copolymer and also, it shows whether or not the content x of compound (X) and proportion y of the maleimide-based monomer unit (B) in the maleimide-based copolymer structure are satisfactory for the relations, x≦0.06y and x=≦3.

The molecular structure of compound (X) was determined by using a GPC column and tetrahydrofuran as an eluate to separate the compound (x) and then, by concentrating followed by drying the tetrahydrofuran solution of the compound (X) and by taking infrared spectra, $^1$H-NMR spectra, $^{13}$C-NMR spectra and FD-mass spectra (field desorption mass spectrometry), whereby the following molecular formulae (IV) and (V) were confirmed.

(IV)

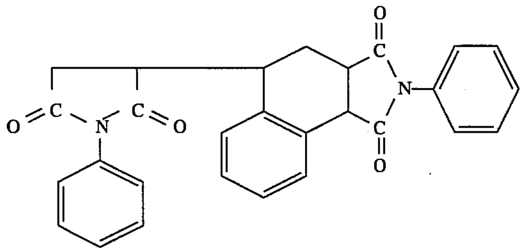

(V)

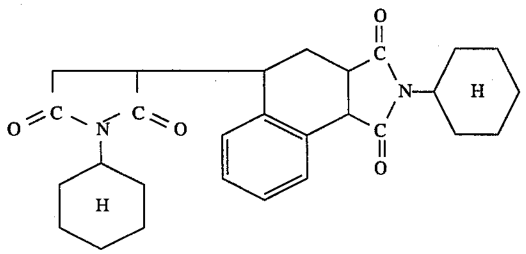

The residual volatile components were determined quantitatively by dissolving an obtained maleimide-based copolymer in chloroform and by measuring the solvent, aromatic vinyl-based monomer (a), maleimide-based monomer (b) and other monomer (c) by gas chromatography.

TABLE 1-3

| | example | | | | | | comparative example | | |
|---|---|---|---|---|---|---|---|---|---|
| | 1-1 | 1-2 | 1-3 | 1-4 | 1-5 | 1-6 | 1-1 | 1-2 | 1-3 |
| No. of copolymer | A-1 | A-2 | A-3 | A-4 | A-5 | A-6 | B-1 | B-2 | B-3 |
| kind and proportion (%) of monomer unit in copolymer structure | | | | | | | | | |
| St unit | 45.7 | 41.7 | 45.4 | 69.3 | 31.1 | 58.2 | 50.6 | 45.7 | 58.2 |
| PMI unit | 54.3 | 58.3 | — | 30.7 | 68.9 | 41.8 | 49.4 | 54.3 | 41.8 |

TABLE 1-3-continued

| | example | | | | | | comparative example | | |
|---|---|---|---|---|---|---|---|---|---|
| | 1-1 | 1-2 | 1-3 | 1-4 | 1-5 | 1-6 | 1-1 | 1-2 | 1-3 |
| CHMI unit | — | — | 54.6 | — | — | — | — | — | — |
| AN unit | — | — | — | — | — | — | — | — | — |
| weight average molecular weight of copolymer (Mw/10000) | 23 | 20 | 19 | 20 | 5 | 15 | 17 | 23 | 15 |
| content (%) of compound (X) in copolymer and number of molecular structure formula | 1.6 (IV) | 1.1 (IV) | 1.2 (IV) | 2.1 (IV) | 2.0 (IV) | 2.4 (IV) | 3.8 (IV) | 4.8 IV) | 4.8 (IV) |
| smaller value in either 0.06y or 3.0 | 3.0 | 3.0 | 3.0 | 1.8 | 3.0 | 2.5 | 3.0 | 3.0 | 2.5 |
| amount of residual volatile components in copolymer (%) (against copolymer) | | | | | | | | | |
| solvent | 0.02 | 0.02 | 0.02 | 0.02 | 0.02 | 0.01 | 0.03 | 0.03 | 0.01 |
| St | 0.02 | 0.01 | 0.02 | 0.04 | 0.01 | 0.05 | 0.02 | 0.02 | 0.05 |
| AN | — | — | — | — | — | — | — | — | — |
| PMI | <0.01 | <0.01 | — | 0.01 | 0.01 | 0.01 | 0.02 | <0.01 | 0.01 |
| CHMI | — | — | <0.01 | — | — | — | — | — | — |

The copolymers obtained from the examples and comparative examples were investigated for heat resistance, impact resistance and molding property, and the results obtained are shown in Table 1-4.

The molding property was determined by observing the color of moldings by the naked eye.

TABLE 1-4

| | | example | | | | | comparative example | | |
|---|---|---|---|---|---|---|---|---|---|
| | | 1-1 | 1-2 | 1-3 | 1-4 | 1-6 | 1-1 | 1-2 | 1-3 |
| No. of copolymer | | A-1 | A-2 | A-3 | A-4 | A-6 | B-1 | B-2 | B-3 |
| properties of copolymer | heat resistance | | | | | | | | |
| | heat deflection temperature (°C.) | 182 | 191 | 168 | 131 | 151 | 160 | 170 | 143 |
| | glass transition temperature | 203 | 213 | 181 | 153 | 174 | 184 | 190 | 196 |
| | Izod impact strength value (kg · cm/cm) | 1.6 | 1.4 | 1.7 | 3.3 | 2.0 | 1.4 | 1.0 | 1.8 |
| | molding properties: color of moldings | light yellow transparent | light brown transparent | pale yellow transparent | light yellow transparent | light yellow transparent | light yellow-white opaque | light yellow transparent | light yellow transparent |

(footnote) Glass transition temperature of the copolymer A-5 obtained from example 1-5 was 230° C.

The indicated heat resistance was shown by numeral values of a glass transition temperature and heat deflection temperature. The transition temperature was determined from a DSC curve of an obtained copolymer measured at a rising temperature speed of 5° C./minute in a nitrogen gas current using α-alumina as a reference. The deflection temperature (load-bending temperature) was determined by carrying out injection molding at a cylinder temperature of 280° C. to obtain a test piece (3 mm thickness) of a maleimide-based copolymer and then, by measuring the piece according to JIS K-7207 under a load condition of 18.5 kgf/cm$^2$. As these values are larger, the heat resistance is further superior.

The indicated impact resistance was determined by that a test piece (3 mm thickness) prepared similarly to that prepared for determining the heat resistance was subjected an Izod impact strength test according to JIS K-7110 to get an Izod impact strength value. As this value is larger, the impact resistance is further superior.

As seen in Tables 1-2 to 1-4, the compound (X) is not removed by an operation to remove volatile components such as unreacted monomers and a solvent, but it remains in the maleimide-based copolymer. When all example and a comparative example having the same material formulation are compared each other, only a small amount of the compound X formation was shown in the example in which the monomers (a) and (b) were gradually supplied to a reaction vessel suitable for a polymerization reaction under a condition of separating these monomers without mixing together beforehand, while a large amount of the compound X formation was shown in the comparative example in which the monomers (a) and (b) were mixed together beforehand or one monomer was gradually supplied to the other monomer charged into a reaction vessel beforehand, so that it is clear that the comparative example affects badly the copolymer properties. In copolymers of the examples, a copolymer in which proportion y of the monomer unit (B) in the copolymer structure is in a range of from 35 to 65% and the content x of compound X is 3% by weight or less and does not exceed a numeral value of 0.06y, is superior in heat resistance and impact resistance compared with a copolymer in which the content x is more than 3% or it exceeds the value of 0.06y.

EXAMPLES 1-7 TO 1-14 AND COMPARATIVE EXAMPLES 1-4 to 1-6

A thermoplastic resin composition was obtained with formulation shown in Table 1-5, using the maleimide-based copolymers A-1 to A-4 and A-6 obtained from the examples 1- 1 to 1-4 and 1-6 or the maleimide-based copolymers B-1 to B 3 obtained from the comparative examples 1-1 to 1-3 and an ABS resin (which is a rubber-modified resin and has a butadiene content of 40%, a styrene content of 42%, and a acrylonitrile content of 18%) or an AS resin (which is an acrylonitrile-styrene resin and has an acrylonitrile content of 28% and a styrene content of 72%) as another thermoplastic resin.

The thermoplastic resin composition was converted into pellets by kneading it at a barrel temperature of 240° C. using a twin screw extruder. Using each pellet, injection molding was carried out at 220° C. to obtain a test piece. With a test piece obtained, a heat deflection temperature value and an Izod impact strength value were measured. Results are shown in Tables 1-5 and 1-6.

As seen in Tables 1-5 and 1-6, compared with the results from the comparative examples 1-4 to 1-6, the examples 1-7 to 1-14 showed smaller amounts in the content of compound (X) of the used maleimide-based copolymers and superior results in physical properties of the thermoplastic resin compositions. Also, those having a proportion y of the monomer unit (B) in the copolymers in a range of from 35 to 65% and having a content of the compound (X) in an amount of 0.06y or less are superior in heat resistance and impact resistance, compared with those having the proportion and content out of the range.

EXAMPLES 1-15 AND 1-16 AND COMPARATIVE EXAMPLE 1 -7

Thermoplastic resin compositions were obtained with the formulation shown in Table 1-7, using the maleimide-based copolymers obtained from the examples 1-1 and 1-2 and comparative example 1-2 and, as another thermoplastic resin, a polyamide (Nylon-6) that is a crystalline resin.

The thermoplastic resin compositions were transformed into pellets by kneading them at a barrel temperature of 280 ° C. using a twin screw extruder. Using pellets obtained in each example, molding plates were prepared and, according to the forementioned method, a heat deflection temperature value and an Izod impact strength value were measured and the color tone and presence or absence of silver were judged by the naked eye. The sink was examined by observing cavities formed on the molding plate surface by the naked eye. Results are shown in Table 1-7.

TABLE 1-5

| thermoplastic resin | example | | | | | | | |
|---|---|---|---|---|---|---|---|---|
| composition | 1-7 | 1-8 | 1-9 | 1-10 | 1-11 | 1-12 | 1-13 | 1-14 |
| formulation (part) | | | | | | | | |
| maleimide-based copolymer (number and amount) | A-1 30 | A-1 50 | A-1 70 | A-1 30 | A-2 30 | A-3 30 | A-4 30 | A-6 30 |
| ABS resin | 70 | 50 | 30 | 50 | 70 | 70 | 70 | 70 |
| AS resin | — | — | — | 20 | — | — | — | — |
| physical properties | | | | | | | | |
| Izod impact strength value (kg · cm/cm) | 18.3 | 12.8 | 6.4 | 14.3 | 16.8 | 17.2 | 19.8 | 18.7 |
| heat deflection temperature (°C.) | 114 | 129 | 148 | 119 | 116 | 110 | 97 | 103 |
| color tone | light yellow | light yellow | light yellow | light yellow | light yellow | light yellow | light yellow | light yellow |

TABLE 1-6

| thermoplastic resin | comparative example | | |
|---|---|---|---|
| composition | 1-4 | 1-5 | 1-6 |
| formulation (part) | | | |
| maleimide-based copolymer (number and amount) | B-1 30 | B-2 30 | B-3 30 |
| ARS resin | 70 | 70 | 70 |
| AS resin | — | — | — |
| physical properties | | | |
| Izod impact strength value (kg · cm/cm) | 15.3 | 12.3 | 16.0 |
| heat deflection temperature (°C.) | 109 | 110 | 102 |
| color tone | pale yellow | yellow-brown | yellow-brown |

TABLE 1-7

| thermoplastic resin | example | | comparative example |
|---|---|---|---|
| composition | 1-15 | 1-16 | 1-7 |
| formulation (part) | | | |
| maleimide-based copolymer (number and amount) | A-1 50 | A-2 50 | B-2 50 |
| polyamide | 50 | 50 | 50 |
| Izod impact strength value (kg · cm/cm) | 2.5 | 2.4 | 2.1 |
| physical properties | | | |
| heat deflection | 159 | 162 | 154 |

TABLE 1-7-continued

| thermoplastic resin | example | | comparative example |
|---|---|---|---|
| composition | 1-15 | 1-16 | 1-7 |
| temperature (°C.) | | | |
| color tone | light yellow | pale yellow | light brown |
| silver | none | none | none |
| sink | none | none | many |

As seen in Table 1-7, in the examples 1-15 and 1-16, the resin compositions having a proportion y of the monomer unit (B) in the copolymers in a range of from 35 to 65% and also, having a content of the compound (X) in an amount of 0.06y or less as well as 3% or less are superior in heat resistance and impact resistance, compared with those obtained from the comparative examples 1-7 which have the proportion and content out of the above range and amount.

Hereinafter, reference examples of maleimide-based copolymers having narrow composition distributions and comparative reference examples are shown. The material composition, charging ratio of styrene, polymerization temperature and polymerization reaction time of reference examples 1 to 8 and comparative reference examples 1 to 4 are summarized and presented in Tables 2-1 and 2-2. The charging ratio of styrene is a weight percent of an amount charged into a reaction vessel to a total amount of styrene.

REFERENCE EXAMPLE 1

Into a polymerization reaction vessel equipped with a condenser, a stirrer, and a dropping funnel, there was charged a material mixture to be charged at an initial stage having a composition shown in Table 2-1, and the mixture was sufficiently dissolved and the interior atmosphere of the vessel was replace by nitrogen gas. The temperature of the polymerization vessel interior was raised up to 80° C. and a material mixture to be added by dropping shown in Table 2-1 was uniformly dropped during 4 hours. A polymerization initiator used was 0.49 parts of tertiary-butylperoxy 2-ethylhexanoate. On the way of dropping, the reaction mixture was sampled at every five minute, the amounts of unreacted styrene and unreacted maleimide were analyzed by gas chromatography and, thus, a mole ratio of the unreacted styrene (a) to the unreacted maleimide (b) was obtained. The dropping velocity and dropping amount were controlled so as to maintain the mole ratio (a) to (b) in a range of from 144 to 222, which was within ±20% of an expected value, 185. That is, when the mole ratio approaches a lower limit in the above range, the dropping velocity of the monomer was delayed and, when it approaches an upper limit, the velocity was fastened, and except these adjustments, the same dropping amount and dropping velocity were continued. After completion of the dropping, the reaction mixture was cooled to obtain a final reaction mixture showing a light yellow color and high viscosity. This final reaction mixture was dropped into a large amount of methanol, a solid portion deposited was filtered, washed, and dried, whereby a copolymer of white color was obtained.

The polymerization percentages of styrene and phenylmaleimide were 51.2% and 94.7%, respectively, against their respective total amount, and the respective average content of the styrene unit and phenylmaleimide unit in the copolymer obtained from elemental analyses was 75.5% and 24.5%.

Figure 2:
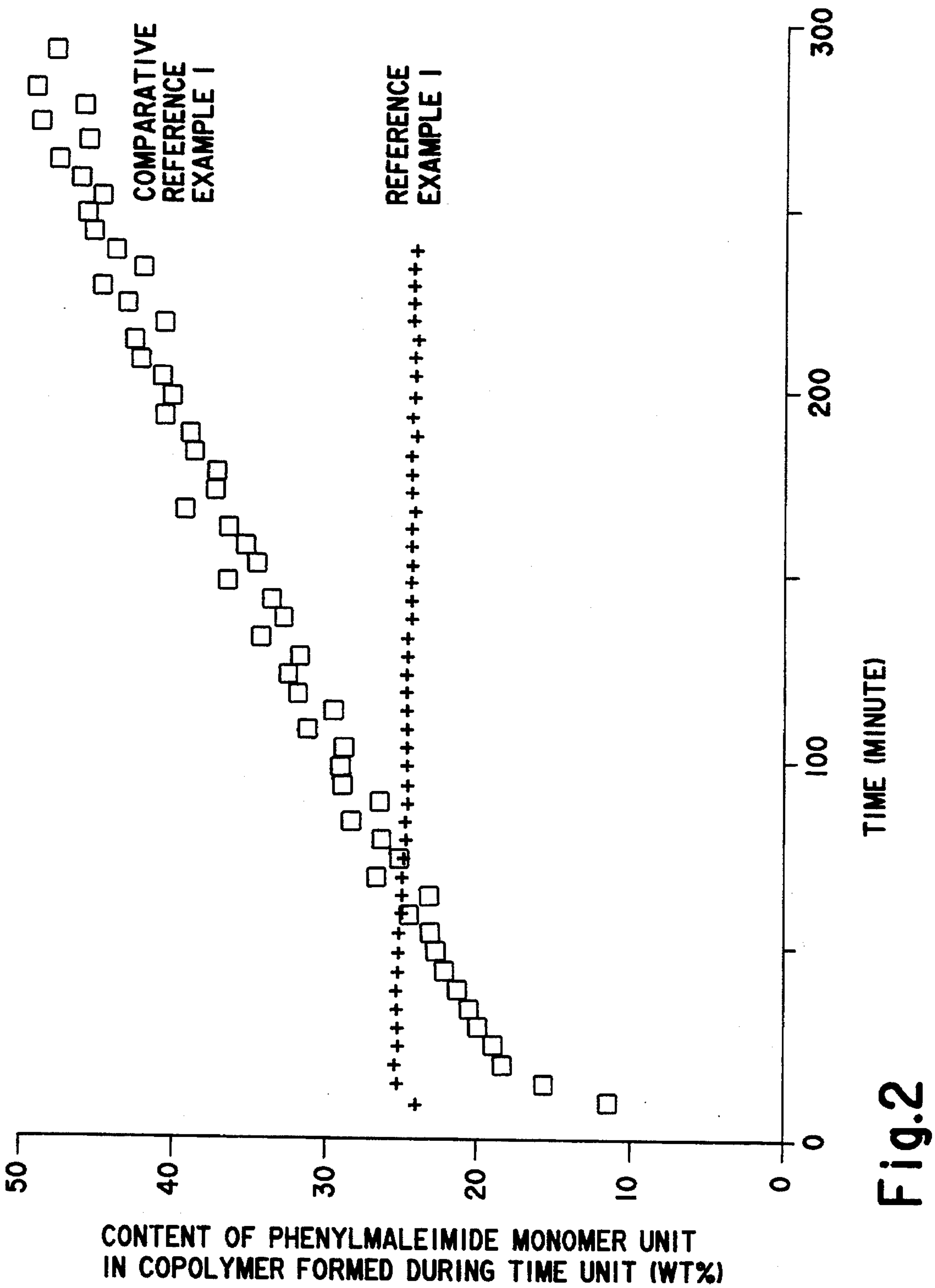
FIG. 2 is a graph showing variation of a content percentage of the maleimide-based monomer unit in a maleimide-based copolymer forming at every five minute interval with passage of the polymerization time in the reference example 1 and comparative reference example 1.
Figure 3:
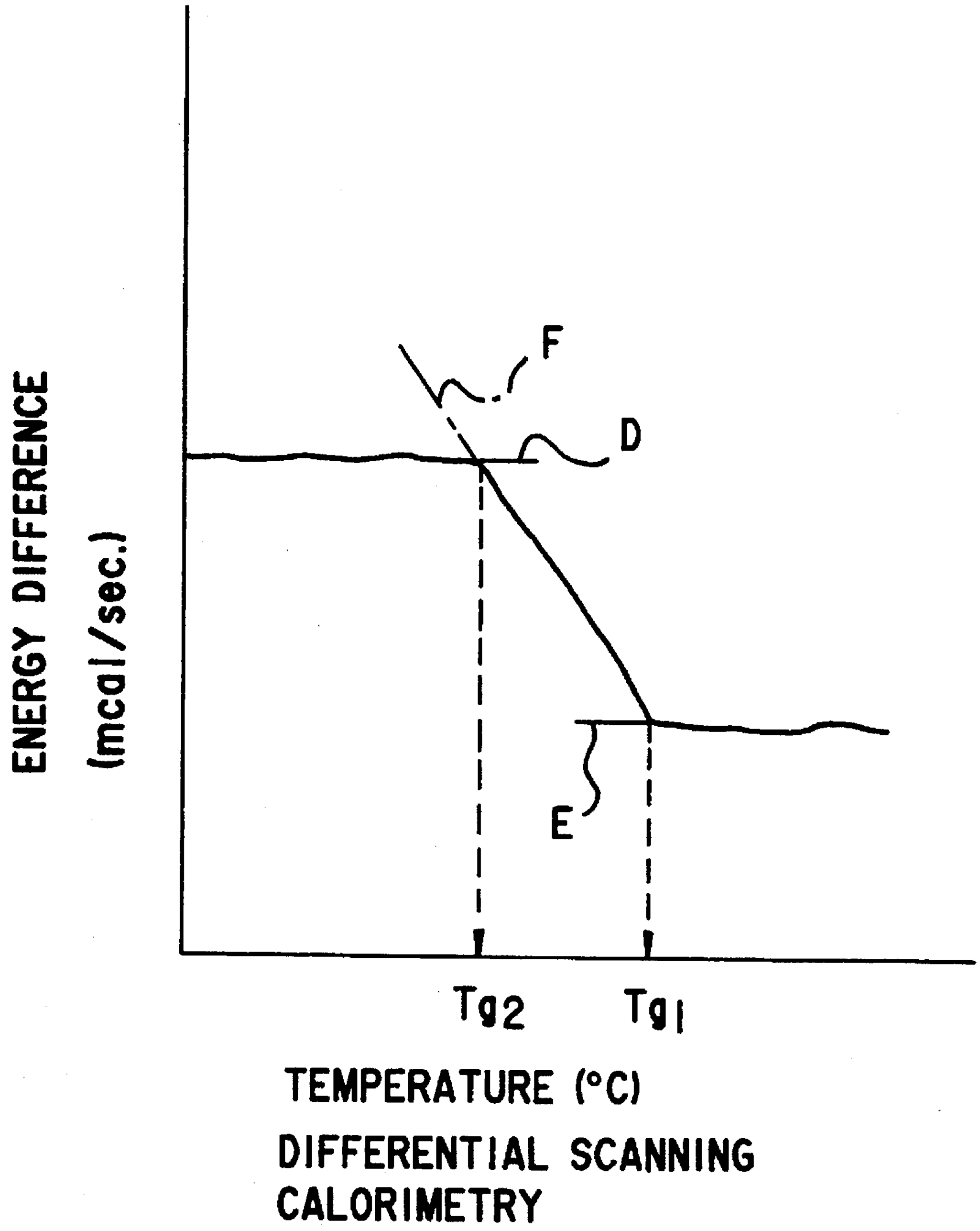
FIG. 3 is a differential thermal curve by DSC of a copolymer.

FIG. 1 shows variation of the mole ratio of unreacted styrene to unreacted phenylmaleic amide at every five minute between the dropping :initiation and the dropping end. In FIG. 1, $M_1$ is an expected value of the mole ratio, $M_2$ is a value of 20% lower than the expected value, and $M_3$ is a value of 20% above than the expected value. FIG. 2 shows variation in a content percentage of the maleimide-based monomer unit (B). Proportion of the maleimide-based monomer unit (B) in the copolymer formed at minute time intervals (in this case, 5 minutes) is represented by the following equation, when consumed amounts of each of the monomers, Y(a) and Y(b), are obtained from differences between supplying amounts of each of the monomers until the sampling time and existing amounts of each of the monomers at the sampling time, and when consumed amounts of each of the monomers at 5 minutes later similarly obtained are represented by Y'(a) and Y'(b).

$$\frac{Y'(b) - Y(b)}{[Y'(a) - Y(a)] + [Y'(b) - Y(b)]} \times 100(\text{\% by weight})$$

The time of reaching a stationary state was 10 minutes and the copolymer formed before reaching the stationary state was 3.4% of the total.

REFERENCE EXAMPLES 2 AND 3

The procedure of the reference example 1 was repeated to obtain a copolymer except; that the material composition, polymerization temperature and polymerization reaction time were changed as shown in Table 2-1, the expected value of the mole ratio (a) to (b) was changed as shown in Table 2-3, and the reaction solution was sampled at every one hour on the way of dropping, but not at every five minute.

REFERENCE EXAMPLE 4

The procedure of the reference example 1 was repeated to obtain a copolymer except that the material composition, polymerization temperature and polymerization reaction time were changed as shown in Table 2-1, the expected value of the mole ratio (a) to (b) was changed as shown in Table 2-3, and the dropping velocity and dropping amount were controlled so that the polymerization temperature was a boiling point (90° C.) of the mixture in the reaction system. When the temperature of the reaction mixture was measured continuously in the course of dropping by a platinum resistance thermometer, the temperature variation was ±0.5° C. or less.

REFERENCE EXAMPLES 5 to 7

The procedure of the reference example 4 was repeated to obtain a copolymer except that the material composition, polymerization temperature and polymerization reaction time were changed as shown in Tables 2-1 and 2-2, the expected value of the mole ratio (a) to (b) was changed as shown in Tables 2-3 and 2-4. However, in the reference example the polymerization reaction was carried out by changing the initiator into 0.04 parts by weight of tertiary-butylperoxy isopropylcarbonate.

COMPARATIVE REFERENCE EXAMPLE 1

The procedure of the reference example 1 was repeated to obtain a copolymer except that the material composition, polymerization temperature and polymerization reaction time were changed as shown in Table 2-2, the expected value of the mole ratio (a) to (b) was changed as shown in Table 2-4.

Variation in the mole ratio of unreacted styrene to unreacted phenylmaleimide at every five minute in the course of from the dropping initiation to the dropping end was shown in FIG. 1. In this FIG. 1, $N_1$ is an expected value of the mole ratio, $N_2$ is a value of 20% lower than the expected value, and $N_3$ is a value of 20% above than the expected value. Variation of the maleimide-based monomer unit in the copolymer obtained from each sampling was shown in FIG. 2. As clearly shown in FIG. 2, the concentrations of each of the monomers were always varying, so that there did not exist any time which can be regarded as a stationary state.

COMPARATIVE REFERENCE EXAMPLES 2 AND 3

The procedure of the reference example 1 was repeated to obtain a copolymer except that the material composition, polymerization temperature and polymerization reaction time were changed as shown in Table 2-2, the expected value of the mole ratio (a) to (b) was changed as shown in Table 2-4, the sampling of the reaction mixture was carried out at every one hour on the way of dropping, but not at every five minute, and the dropping velocity and dropping amount were not controlled.

COMPARATIVE REFERENCE EXAMPLE 4

The procedure of the reference example 4 was repeated to obtain a copolymer except that the polymerization reaction was carried out for further 1 hour by still maintaining the bath temperature at 95° C. after completion of the dropping.

In the above-described examples and comparative examples, mole ratios (a) to (b) of the unreacted styrene to the unreacted phenylmaleimide at every one hour from the dropping initiation, expected values of the mole ratio, and values of 20% above and lower than the expected value were presented in Tables 2-3 and 2-4. Content percentages of the maleimide-based monomer unit in a copolymer formed during a time unit and polymerization-conversion at every one hour were presented in Tables 2-5 and 2-6.

The unreacted styrene, unreacted phenylmaleimide, unreacted acrylonitrile and solvent in the above-described reference examples and comparative reference examples were measured by gas choromatography and also, compositions of the copolymers obtained were measured by elementary analyses. The results are shown in Tables 2-7 and 2-8. The mean content percents of each monomer unit in each of the maleimide-based copolymers obtained from the above-described examples and comparative examples and also, the content percentage of molecules, in which the percents containing the maleimide-based monomer unit are within ±10% of the mean value, were presented in Tables 2-7 and 2-8. The time of reaching a stationary state and proportion of copolymers formed during this time against all formed copolymers were shown in Table 2-9.

TABLE 2-1

| | reference example | | | | |
|---|---|---|---|---|---|
| | 1 | 2 | 3 | 4 | 5 |
| initially charging material (part by weight) | | | | | |
| ST | 7.9 | 18.6 | 24.0 | 20.8 | 6.3 |
| PMI | — | — | — | — | — |
| AN | — | — | 1.3 | — | — |
| toluene | — | 4.3 | — | — | — |
| MEK | 31.5 | — | 1.0 | 31.3 | 25.0 |
| dropping material (part by weight) | | | | | |
| ST | 32.0 | 11.9 | 16.1 | 22.6 | 24.3 |
| PMI | 7.0 | 19.5 | 16.8 | 19.4 | 20.9 |
| AN | — | — | — | — | — |
| toluene | — | 45.7 | — | — | — |
| MEK | 21.6 | — | 40.8 | 5.9 | 23.5 |
| charging ratio of ST (%) | 19.8 | 61.0 | 59.9 | 47.9 | 20.6 |
| reaction conditions | | | | | |
| polymerization temperature (°C.) | 80 | 90 | 80 | 90 | 82 |
| polymerization time (h) | 4 | 4 | 4 | 4 | 6 |

(footnote)
ST: styrene
PMI: phenylmaleimide
AN: acrylonitrile
MEK: methyl ethyl ketone

TABLE 2-2

| | reference example | | comparative reference example | | | |
|---|---|---|---|---|---|---|
| | 6 | 7 | 1 | 2 | 3 | 4 |
| initially charging material (part by weight) | | | | | | |
| ST | 32.1 | 3.1 | 38.1 | 11.6 | — | 20.8 |
| PMI | — | — | — | — | — | — |
| AN | — | — | — | — | — | — |
| toluene | — | — | — | — | — | — |
| MEK | ‘8.0 | 28.1 | 4.2 | 3.0 | 33.9 | 31.3 |
| dropping material (part by weight) | | | | | | |
| ST | 28.4 | 23.9 | — | 12.1 | 47.4 | 22.6 |
| PMI | 29.7 | 27.7 | 17.6 | 20.2 | 11.4 | 19.4 |
| AN | — | — | — | — | — | — |
| toluene | — | — | — | — | — | — |
| MEK | 1.8 | 17.2 | 40.1 | 53.1 | 7.3 | 5.9 |
| charging ratio of ST (%) | 53.1 | 11.5 | 100.0 | 48.9 | — | 47.9 |
| reaction conditions | | | | | | |
| polymerization temperature (°C.) | 110 | 80 | 80 | 80 | 90 | 90 |
| polymerization time (h) | 4 | 6 | 5 | 6 | 4 | 5 |

(footnote)
ST: styrene
PMI: phenylmaleimide
AN: acrylonitrile
MEK: methyl ethyl ketone

TABLE 2-3

| | reference example | | | | |
|---|---|---|---|---|---|
| | 1 | 2 | 3 | 4 | 5 |
| mole ratio between monomers (a)/(b) | | | | | |
| after 1 hour | 178.2 | 74.4 | 79.3 | 34.8 | 42.2 |
| after 2 hours | 184.8 | 76.5 | 97.4 | 34.9 | 35.8 |

TABLE 2-3-continued

| | reference example | | | | |
|---|---|---|---|---|---|
| | 1 | 2 | 3 | 4 | 5 |
| after 3 hours | 186.8 | 72.2 | 92.5 | 36.2 | 33.5 |
| after 4 hours | 186.5 | 73.7 | 106.3 | 41.2 | 32.8 |
| after 5 hours | — | — | — | — | 32.3 |
| after 6 hours | — | — | — | — | 31.9 |
| experted value | 185 | 76.0 | 91.0 | 36.6 | 35.2 |
| 20% above and | 148 | 60.8 | 72.8 | 29.3 | 28.2 |
| lower than | to | to | to | to | to |
| expected value | 222 | 91.2 | 109.2 | 43.9 | 42.2 |

TABLE 2-4

| | reference example | | comparative example | | | |
|---|---|---|---|---|---|---|
| | 6 | 7 | 1 | 2 | 3 | 4 |
| mole ratio between monomers (a)/(b) | | | | | | |
| after 1 hour | 40.4 | 26.7 | 172.4 | 91.4 | 36.7 | 35.4 |
| after 2 hours | 31.6 | 22.3 | 104.7 | 38.6 | 56.6 | 36.7 |
| after 3 hours | 30.5 | 20.5 | 63.9 | 23.7 | 67.9 | 36.5 |
| after 4 hours | 30.5 | 19.4 | 38.8 | 16.9 | 74.4 | 37.1 |
| after 5 hours | — | 18.7 | 22.7 | 16.3 | — | 232.0 |
| after 6 hours | — | 18.0 | — | 15.5 | — | — |
| expected value | 35.2 | 22.5 | 50.0 | 24.0 | 52.4 | 36.6 |
| 20% above and | 28.2 | 18.0 | 40.0 | 19.2 | 41.9 | 29.3 |
| lower than | to | to | to | to | to | to |
| expected value | 42.2 | 27.0 | 60.0 | 28.8 | 62.9 | 43.9 |

TABLE 2-5

| | reference example | | | | |
|---|---|---|---|---|---|
| | 1 | 2 | 3 | 4 | 5 |
| maleimide-based monomer unit in copolymer formed during time unit indicated (% by weight) | | | | | |
| from 0 to 1 hour | 24.9 | 35.0 | 36.9 | 50.3 | 47.6 |
| from 1 to 2 hours | 24.7 | 38.5 | 39.0 | 50.7 | 52.4 |
| from 2 to 3 hours | 24.4 | 39.3 | 37.3 | 49.9 | 50.5 |
| from 3 to 4 hours | 24.3 | 39.0 | 37.8 | 51.3 | 50.8 |
| from 4 to 5 hours | — | — | — | — | 51.1 |
| from 5 to 6 hours | — | — | — | — | 49.5 |
| polymerization-conversion at time indicated (% by weight) | | | | | |
| 1 hour later | 13.7 | 25.6 | 16.7 | 12.2 | 13.1 |
| 2 hours later | 28.2 | 50.2 | 35.6 | 30.5 | 25.7 |
| 3 hours later | 42.9 | 75.0 | 55.0 | 45.5 | 38.9 |
| 4 hours later | 57.7 | 99.6 | 74.3 | 58.7 | 52.1 |
| 5 hours later | — | — | — | — | 65.2 |
| 6 hours later | — | — | — | — | 78.7 |

TABLE 2-6

| | reference example | | comparative reference example | | | |
|---|---|---|---|---|---|---|
| | 6 | 7 | 1 | 2 | 3 | 4 |
| maleimide-based monomer unit in copolymer formed during time unit | | | | | | |

TABLE 2-6-continued

| | reference example | | comparative reference example | | | |
|---|---|---|---|---|---|---|
| | 6 | 7 | 1 | 2 | 3 | 4 |
| indicated (% by weight) | | | | | | |
| from 0 to 1 hour | 48.6 | 55.2 | 20.1 | 45.0 | 52.2 | 50.3 |
| from 1 to 2 hours | 50.1 | 55.5 | 28.6 | 49.9 | 45.2 | 50.8 |
| from 2 to 3 hours | 51.2 | 55.3 | 35.7 | 57.3 | 41.7 | 49.8 |
| from 3 to 4 hours | 51.8 | 55.6 | 42.2 | 61.0 | 39.7 | 51.5 |
| from 4 to 5 hours | — | 55.7 | 47.9 | 54.9 | — | *1 22.6<br>*2 14.9<br>*3 13.6 |
| from 5 to 6 hours | — | 56.1 | — | 50.2 | — | — |
| polymerization-conversion at time indicated (% by weight) | | | | | | |
| 1 hour later | 13.8 | 11.6 | 24.3 | 17.8 | 7.8 | 12.3 |
| 2 hours later | 28.1 | 23.5 | 46.1 | 30.8 | 18.2 | 27.8 |
| 3 hours later | 43.9 | 35.4 | 61.8 | 43.4 | 29.4 | 43.5 |
| 4 hours later | 60.1 | 47.3 | 75.2 | 55.0 | 41.0 | 58.7 |
| 5 hours later | — | 59.1 | 86.9 | 70.0 | — | 68.9 |
| 6 hours later | — | 70.8 | — | 84.9 | — | — |

(footnote)
*1 . . . from 4:00 to 4:20 (hour:minute)
*2 . . . from 4:20 to 4:40 (hour:minute)
*3 . . . from 4:40 to 5:00 (hour:minute)

TABLE 2-7

| | reference example | | | | |
|---|---|---|---|---|---|
| | 1 | 2 | 3 | 4 | 5 |
| composition of reaction solution at final stage (% by weight) | | | | | |
| ST | 19.6 | 0.0 | 13.7 | 24.8 | 10.4 |
| PMI | 0.2 | 0.2 | 0.0 | 1.1 | 0.5 |
| AN | — | — | 0.2 | — | — |
| toluene | — | 50.0 | — | — | — |
| MER | 53.1 | — | 41.8 | 37.2 | 48.5 |
| maleimide-based copolymer | 27.1 | 49.8 | 44.3 | 36.9 | 40.6 |
| composition unit of maleimide-based copolymer (% by weight) | | | | | |
| ST unit | 75.5 | 61.2 | 59.7 | 50.5 | 49.7 |
| PMI unit | 24.5 | 38.8 | 37.8 | 49.5 | 50.3 |
| AN unit | — | — | 2.5 | — | — |
| content of molecules having content of maleimide-based monomer unit within 10% above and lower than average value (% by weight) | 96.6 or more | 95.7 or more | 95.1 or more | 95.3 or more | 98.3 or more |

(footnote)
ST: styrene
PMI: phenylmaleimide
AN: acrylonitrile
MEK: methyl ethyl ketone

TABLE 2-8

| | reference example | | comparative reference example | | | |
|---|---|---|---|---|---|---|
| | 6 | 7 | 1 | 2 | 3 | 4 |
| composition of reaction solution at final stage (% by weight) | | | | | | |

TABLE 2-8-continued

| | reference example 6 | reference example 7 | comparative reference example 1 | comparative reference example 2 | comparative reference example 3 | comparative reference example 4 |
|---|---|---|---|---|---|---|
| ST | 32.9 | 15.0 | 6.7 | 6.0 | 33.9 | 19.4 |
| PMI | 1.8 | 1.4 | 0.5 | 0.6 | 0.7 | 0.1 |
| AN | — | — | — | — | — | — |
| toluene | — | — | — | — | — | — |
| MEK | 13.1 | 44.1 | 44.9 | 56.0 | 41.2 | 37.3 |
| maleimide-based copolymer | 52.2 | 39.5 | 47.9 | 37.4 | 24.2 | 43.2 |
| composition unit of maleimide-based copolymer (% by weight) | | | | | | |
| ST unit | 49.8 | 44.4 | 68.0 | 47.6 | 56.0 | 54.6 |
| PMI unit | 50.2 | 55.6 | 32.0 | 52.4 | 44.0 | 45.4 |
| AN unit | — | — | — | — | — | |
| content of molecules having content of maleimide-based monomer unit within 10% above and lower than average value (% by weight) | 95.3 or more | 98.3 or more | 25 | 65 | 53 | 81.6 |

(footnote)
ST: styrene
PMI: phenylmaleimide
AN: acrylonitrile
MEK: methyl ethyl ketone

TABLE 2-9

| | reference example 1 | reference example 2 | reference example 3 | reference example 4 |
|---|---|---|---|---|
| time until reaching stationary state (minute) | 10 | 10 | 20 | 20 |
| ratio of copolymer formed until reaching stationary state (%) | 3.4 | 4.3 | 4.9 | 4.7 |

TABLE 2-9-continued

| | reference example 1 | reference example 2 | reference example 3 | comparative reference example 4 |
|---|---|---|---|---|
| time until reaching stationary state (minute) | 10 | 20 | 10 | 20 |
| ratio of copolymer formed until reaching stationary state (%) | 1.7 | 4.7 | 1.7 | 4.7 |

As seen in Tables 2-1 to 2-9, the copolymers in the reference examples show small variation and uniformity in the maleimide-based monomer unit by sampling in the course of a polymerization reaction. In contrast, the copolymers in the comparative reference examples show large variation in the monomer ratio (a) to (b) in the course of a polymerization reaction and also, the composition of copolymers was non-uniform.

The weight average molecular weight, number average molecular weight, glass transition temperature and MFR of the copolymers obtained from the above-described reference examples and comparative reference examples were investigated and the results are shown in Table 2-10.

The weight average molecular weight and number average molecular weight were calculated taking a polystyrene standard polymer as a standard from an elution curve on gel permeation chromatography (GPC) in which tetrahydrofuran was used as a solvent.

The glass transition temperature is a curving point obtained by a tangent modulus method from a DSC curve measured at a rising temperature rate of 5° C. per minute using α-alumina as a reference under a nitrogen atmosphere and using a DSC-8230 model made by Rigaku Denki Co., Ltd.

The MFR was measured at the temperatures shown in Table 2-10 using a Shimazu Flow Tester CFT-500, according to the procedure of JIS-K7210.

TABLE 2-10

| | | reference example 1 | 2 | 3 | 4 | 5 | 6 | 7 | comparative reference example 1 | 2 | 3 | 4 |
|---|---|---|---|---|---|---|---|---|---|---|---|---|
| physical properties of copolymer | weight average molecular weight/$10^4$ | 11.2 | 11.0 | 14.8 | 19.0 | 21.0 | 23.0 | 26.2 | 16.0 | 18.0 | 10.7 | 21.0 |
| | number average molecular weight/$10^4$ | 4.1 | 4.2 | 7.3 | 9.7 | 9.2 | 10.2 | 11.0 | 8.0 | 8.5 | 5.3 | 10.7 |
| | glass transition temperature (°C.) | 160 | 174 | 165 | 193 | 196 | 198 | 200 | 145 | 192 | 168 | 188 |
| | MFR (g/10 min) | 5.5 | 3.7 | 2.8 | 2.2 | 2.1 | 1.7 | 1.8 | 2.6 | 1.1 | 2.5 | 1.2 |
| | MFR-measuring temperature (°C.) | 230 | 240 | 240 | 240 | 240 | 240 | 240 | 230 | 240 | 240 | 240 |

As seen in Table 2-10, the copolymers in the reference examples showed high glass transition temperature and large MFR. On the other hand, glass transition temperature of the copolymers in the comparative reference examples were low when they were judged from the composing proportions of maleimide-based monomers and also, the copolymers showed small MFR.

EXAMPLES 2-1 TO 2-2

The procedure of the reference example 1 was repeated to obtain a white maleimide-based copolymer, except: that a dropping material mixture having formulation shown in Table 2-1 was not dropped but that dropping material mixtures and (2) having formulation shown in Table 2-11 were separately dropped from dropping baths (i) and (2) respectively.

EXAMPLE 2-3

The procedure of the reference example 5 was repeated to obtain a white maleimide-based copolymer, except that a dropping material mixture having formulation shown in Table 2-1 was not dropped but that dropping material mixtures (1) and (2) having formulation shown in Table 2-11 were separately dropped from dropping baths (1) and (2) respectively.

TABLE 2-11

| | | | example | | |
|---|---|---|---|---|---|
| | | | 2-1 | 2-2 | 2-3 |
| material formulation (part) | polymerization bath | St | 7.9 | 18.6 | 6.3 |
| | | AN | — | — | — |
| | | PMI | — | — | — |
| | | solvent | 31.5 | 4.3 | 25.0 |
| | | initiator | 0.5 | 0.5 | 0.5 |
| | dropping bath (1) | St | 32.0 | 11.9 | 24.3 |
| | | initiator | — | — | — |
| | dropping bath (2) | St | — | — | — |
| | | PMI | 7.0 | 19.5 | 20.9 |
| | | CHMI | — | — | — |
| | | AN | — | — | — |
| | | solvent | 21.0 | 45.7 | 23.5 |
| | | dissolving temperature (°C.) | N.T. | N.T. | 40 |
| polymerization condition | polymerization temperature (°C.) | | 80 | 90 | 82 |
| | polymerization time (hour) | | 4 | 4 | 6 |
| | maturing time (hour) | | — | — | — |
| | solvent | | MEK | MEK | MEK |
| | initiator | | a | a | a |

(footnote): In Table, "a" denotes tertiary-butylperoxy-2-ethylhexanoate; and "N.T." denotes normal temperature.

In the examples 2-1 to 2-3, when the polymerization reactions finished, composition of the reaction mixtures was measured by gas chromatography and results are presented in Table 2-12.

TABLE 2-12

| | | example | | |
|---|---|---|---|---|
| No. of copolymer | | 2-1 A-101 | 2-2 A-102 | 2-3 A-103 |
| composition of reaction mixture at end of polymerization (%) | St | 19.6 | 0.0 | 10.4 |
| | PMI | 0.2 | 0.2 | 0.5 |
| | CHMI | — | — | — |
| | AN | — | — | — |
| | solvent | 53.1 | 50.0 | 48.5 |
| | maleimide-based copolymer | 27.6 | 50.3 | 40.6 |

Regarding the maleimide-based copolymers finally obtained from the examples 2-1 to 2-3, the kind and proportion of monomer units in the copolymer structure, the weight average molecular weight of the copolymers, the content of compound (X), and residual amount of volatile components were measured as forementioned and are presented in Table 2-13.

TABLE 2-13

| | | example | | |
|---|---|---|---|---|
| No. of copolymer | | 2-1 A-101 | 2-2 A-102 | 2-3 A-103 |
| kind and proportion (%) of monomer unit in copolymer structure | St unit | 75.4 | 62.0 | 50.3 |
| | PMI unit | 24.6 | 38.0 | 49.7 |
| | CHMI unit | — | — | — |
| | AN unit | — | — | — |
| weight average molecular weight of copolymer (Mw/10000) | | 11 | 11 | 21 |
| content (%) of compound (X) in copolymer and number of molecular structure formula | | 1.7 | 1.6 | 1.6 |
| | | (IV) | (IV) | (IV) |
| smaller value in either 0.06y or 3.0 | | 1.5 | 2.3 | 3.0 |
| amount of residual volatile components in copolymer (%) (against copolymer) | solvent | 0.07 | 0.08 | 0.06 |
| | St | 0.01 | 0.01 | 0.01 |
| | AN | — | — | — |
| | PMI | 0.01 | 0.01 | 0.02 |
| | CHMI | — | — | — |

The copolymers obtained from the examples 2-1 to 2-3 were investigated for heat resistance, impact resistance and molding property as forementioned, and the results obtained are shown in Table 2-14.

TABLE 2-14

| | | | example | | |
|---|---|---|---|---|---|
| No. of copolymer | | | 2-1 A-101 | 2-2 A-102 | 2-3 A-103 |
| properties of copolymer | heat resistance | heat deflection temperature (°C.) | 122 | 148 | 171 |
| | | glass transition temperature (°C.) | 145 | 177 | 197 |
| | Izod impact strength value (kg.cm/cm) | | 3.4 | 2.4 | 1.6 |
| | molding properties: color of moldings | | light yellow transparent | light yellow transparent | light yellow transparent |

EXAMPLE 2-4

A thermoplastic resin composition was obtained with formulation shown in Table 2-15, using the maleimide-based copolymer A-102 obtained from the example 2-2 and an ABS resin (which is a rubber-modified resin and has a butadiene content of 40%, a styrene content of 42%, and a acrylonitrile con, tent of 18%) as another thermoplastic resin.

The thermoplastic resin composition was converted into pellets by kneading it at a barrel temperature of 240 using a twin screw extruder. Using each pellet, injection molding was carried out at 220° C. to obtain a test piece. With a test piece obtained, a heat deflection temperature value and an Izod impact strength value were measured. Results are shown in Table 2-15.

TABLE 2-15

| thermoplastic resin composition | | example 2-4 |
|---|---|---|
| formulation (part) | maleimide-based copolymer | A-102 |
| | (number and amount) | 30 |
| | ABS resin | 70 |
| physical properties | Izod impact strength value (kg.cm/cm) | 19.3 |
| | heat deflection temperature (°C.) | 104 |
| | color tone | light yellow |

EXAMPLE 2-5

Thermoplastic resin composition was obtained with the formulation shown in Table 2-16, using the maleimide-based copolymer A-102 obtained from the example 2-2 and, as another thermoplastic resin, a polyamide (Nylon-6) that is a crystalline resin.

The thermoplastic resin composition was transformed into pellets by kneading them at a barrel temperature of 280° C. using a twin screw extruder. Using pellets obtained in each example, molding plates were prepared and, according to the forementioned method, a heat deflection temperature value and an Izod impact strength value were measured and the color tone and presence or absence of silver were judged by the naked eye. The sink was examined by observing cavities formed on the molding plate surface by the naked eye. Results are shown in Table 2-16.

TABLE 2-16

| thermoplastic resin composition | | example 2-5 |
|---|---|---|
| formulation (part) | maleimide-based copolymer | A-102 |
| | (number and amount) | 50 |
| | polyamide | 50 |
| physical properties | Izod impact strength value (kg.cm/cm) | 2.6 |

TABLE 2-16-continued

| thermoplastic resin composition | | example 2-5 |
|---|---|---|
| | heat deflection temperature (°C.) | 137 |
| | color tone | light yellow |
| | silver | none |
| | sink | none |

EXAMPLES 3-1 to 3-5

Into a polymerization reaction vessel equipped with a condenser, a stirrer, two dropping funnels were charged a monomer to be charged at an initial stage having the composition shown in Table 3-1 with a solvent, which were dissolved sufficiently to make a solution, and the interior atmosphere was replaced by nitrogen gas. The interior of polymerization reaction vessel was warmed up temperature shown in Table 3-1, a polymerization initiator for the initial stage was added to initiate a reaction and the dropping material mixtures I and II having two kinds of composition shown in Table 3-1 were uniformly dropped from different dropping funnels during the time shown in Table 3-1 to undergo polymerization. The composition of reaction solutions when the dropping additions being completed, polymerization-conversion and structure of copolymers were shown in Table 3-2. After completion of the dropping, the maturing reaction was carried out under the conditions shown in Table 3-3, whereby reaction solutions containing maleimide-based copolymers were obtained. In Table 3-3, when the column of "presence of oxygen" denotes "yes", a mixed gas in which air and nitrogen gas were blended in a 1 to 4 volume ratio was bubbled by a volume amount of one-fifth of the reaction vessel per minute. The composition of reaction solutions when the maturing reactions being completed, polymerization-conversion, structure of copolymers and variation ratio (calculated from the eq. 1 as shown below) of the content of maleimide-based monomer unit (B) (here, the N-phenylmaleimide unit) before and after the maturing reaction were presented in Table 3-4.

The reaction solution obtained was treated by using a vent type (44 mm diameter) twin screw extruder under conditions that a temperature of copolymer was in a range of from 270° to 300° C. and a vacuum degree was 20 Torr, whereby a maleimide-based copolymer of a pellet type was obtained.

$$V = \frac{W_1 - W_2}{W_2} \qquad \text{eq. 1}$$

(Where V denotes variation ratio of maleimide-based monomer unit (B) content in copolymer, $W_1$ denotes weight % of the monomer unit (B) in copolymer finally formed, and $W_2$ denotes weight % of the monomer unit (B) in copolymer at dropping end.)

EXAMPLE 3-6

The procedure of the example 3-1 was repeated to obtain a maleimide-based copolymer of a pellet type except that, after the end of dropping, the maturing reaction was not carried out.

EXAMPLE 3-7

The procedure of example 1 was repeated to obtain a maleimide-based copolymer of a pellet type except that, after the end of dropping, the maturing reaction was carried out without adding a polymerization inhibitor.

Each of the pellets obtained from the examples 3-1 to 3-7 was dissolved in a solvent shown in Table 3-1 to measure volatile components by gas chromatography and it was found that the volatile components in the pellets decreased to 0.5% by weight or less. The composition at the end of dropping and at the end of maturing was determined by sampling a part of the reaction solutions and measuring the amount of unreacted monomers and the amount of solvents. The composition of copolymers was calculated from the charged amount of monomers and the amount of unreacted monomers.

Meanwhile, abbreviations of the compounds in Table 3-1 are as follows.

ST: styrene

AN: acrylonitrile

PMI: N-phenylmaleimide

CHMI: N-cyclohexylmaleimide

MEK: methyl ethyl ketone

Tol: toluene

PBO: tertiary-butylperoxy 2-ethylhexanoate

BIC: tertiary-butylperoxy isopropylcarbonate

PHM: 1,1-bis (tertiary-butylperoxy) 3,3,5-trimethylcyclohexane

TABLE 3-1

| polymerization method | | | α | β | τ |
|---|---|---|---|---|---|
| composition of charging solution (part) | polymerization reaction bath | polymerization initiator | PBO 0.01 | BIC 0.01 | BIC 0.01 |
| | | aromatic vinyl-based monomer (a) | ST 21.1 | ST 4.4 | ST 4.4 |
| | | other vinyl-based monomer (c) | — | — | AN 5.5 |
| | | solvent | MEK 31.9 | Tol 41.3 | Tol 41.3 |
| | dropping bath I | maleimide-based monomer (b) | PMI 19.1 | PMI 20.7 | CHMI 20.7 |
| | | solvent | MEK 5.3 | Tol 13.8 | Tol 13.8 |
| | dropping bath II | polymerization initiator | PBO 0.04 | BIC 0.03 | BIC 0.03 |
| | | aromatic vinyl-based monomer (a) | ST 22.6 | ST 19.8 | ST 13.0 |
| | | other vinyl-based monomer (c) | — | — | AN 1.3 |
| polymerization temperature (°C.) | | | 90 | 113 | 110 |
| polymerization time (hour) | | | 4.0 | 3.5 | 3.5 |

TABLE 3-2

| polymerization method | | α | β | τ |
|---|---|---|---|---|
| composition of reaction solution at dropping end (part) | maleimide-based copolymer | 38.6 | 36.9 | 37.4 |
| | aromatic vinyl-based monomer (a) | 23.5 | 7.1 | 5.9 |
| | maleimide-based monomer (b) | 0.7 | 0.9 | 1.2 |
| | other vinyl-based monomer (c) | — | — | 0.4 |
| | solvent | 37.0 | 55.1 | 55.1 |
| polymerization- | aromatic vinyl-based monomer (a) | 46.2 | 70.7 | 66.1 |

TABLE 3-2-continued

| polymerization method | | α | β | τ |
|---|---|---|---|---|
| conversion (%) | maleimide-based monomer (b) | 96.3 | 95.7 | 94.2 |
| | other vinyl-based monomer (c) | — | — | 93.8 |
| structure of maleimide-based copolymer formed until dropping end (%) | aromatic vinyl-based monomer unit (A) | 52.3 | 46.3 | 30.8 |
| | maleimide-based monomer unit (B) | 47.7 | 53.7 | 52.2 |
| | other vinyl-based monomer unit (C) | — | — | 17.1 |

TABLE 3-3

| | | example | | | | | | |
|---|---|---|---|---|---|---|---|---|
| polymerization method | | 3-1<br>α | 3-2<br>β | 3-3<br>τ | 3-4<br>β | 3-5<br>β | 3-6<br>α | 3-7<br>α |
| maturing process | maturing temperature (°C.) | 90 | 110 | 110 | 110 | 110 | cooling | 90 |
| | maturing time (hour) | 1.0 | 1.5 | 1.5 | 1.5 | 1.5 | without | 1.0 |
| | kind and addition amount of polymerization initiator (part) (See footnote.) | A<br>0.5 | A<br>0.5 | A<br>0.5 | B<br>0.5 | A<br>0.05 | maturing | — |
| | presence of oxygen | yes | yes | yes | no | yes | | — |

(footnote) A: p-tert-butylcatechol
B: benzoquinone
Amount of polymerization initiator is shown in a ratio to 100 parts of total amount of residual monomers.

TABLE 3-4

| | | example | | | | | | |
|---|---|---|---|---|---|---|---|---|
| | | 3-1 | 3-2 | 3-3 | 3-4 | 3-5 | 3-6 | 3-7 |
| composition of reaction solution at maturing end (part) | maleimide-based copolymer | 40.28 | 38.90 | 40.23 | 38.90 | 38.90 | 39.18 | 42.00 |
| | aromatic vinyl-based monomer (a) | 22.51 | 5.99 | 4.62 | 5.99 | 5.99 | 23.21 | 20.80 |
| | maleimide-based monomer (b) | 0.01 | 0.01 | 0.03 | 0.01 | 0.02 | 0.41 | 0.01 |
| | other vinyl-based monomer (c) | — | — | 0.02 | — | — | — | — |
| | solvent | 37.20 | 55.10 | 55.10 | 55.10 | 55.10 | 37.20 | 37.20 |
| polymerization-conversion (%) | aromatic vinyl-based monomer (a) | 48.49 | 75.25 | 73.45 | 75.25 | 75.25 | 46.89 | 52.40 |
| | maleimide-based monomer (b) | 99.95 | 99.95 | 99.86 | 99.95 | 99.90 | 97.85 | 99.97 |
| | other vinyl-based monomer (c) | — | — | 99.71 | — | — | — | — |
| structure of maleimide-based copolymer finally formed (%) | aromatic vinyl-based monomer unit (A) | 52.61 | 46.81 | 31.77 | 46.81 | 46.82 | 52.30 | 54.53 |
| | maleimide-based monomer unit (B) | 47.39 | 53.19 | 51.38 | 53.19 | 53.18 | 47.70 | 45.47 |
| | other vinyl-based monomer unit (C) | — | — | 16.85 | — | — | — | — |
| variation ratio of maleimide-based monomer unit content in copolymer | | −0.58 | −0.88 | −1.52 | −0.88 | −0.90 | 0.07 | −4.62 |

As seen in Tables 3-1 to 3-4, in all the examples 3-1 to 3-5, the maleimide-based monomers were decreased to 0.1% or less by the maturing reactions, and variation in the composition of copolymers was small before and after the maturing. In the example 3-6, the maleimide-based monomer remained much because no maturing reaction was carried out. In the example 3-7, the maleimide-based monomer decreased to 0.1% or less, but variation in the composition of copolymers was large before and after the maturing.

Regarding the maleimide-based copolymers finally obtained from the examples 3-1 to 3-7, the weight average molecular weight of the copolymers, the content of compound (X) in the copolymers, the number of molecular structure formula of the compound (X), and smaller value in either 0.06y or 3.0 were measured as forementioned and are presented in Table 3-5.

TABLE 3-5

| | example | | | | | | |
|---|---|---|---|---|---|---|---|
| | 3-1 | 3-2 | 3-3 | 3-4 | 3-5 | 3-6 | 3-7 |
| weight average molecular weight of copolymer (Mw/10000) | 10 | 18 | 13 | 18 | 18 | 10 | 10 |
| content (%) of compound (X) in copolymer and number of | 1.5 | 1.4 | 1.5 | 1.4 | 1.4 | 1.5 | 1.5 |
| molecular structure formula | (IV) | (IV) | (V) | (IV) | (IV) | (IV) | (IV) |
| smaller value in either 0.06y or 3.0 | 2.8 | 3.0 | 3.0 | 3.0 | 3.0 | 2.8 | 2.8 |

Glass transition temperature, coloring and transparency for each of copolymers obtained from the examples 3-1 to 3-7 were investigated as follows. The glass transition temperature was obtained by a midpoint method from a DSC curve measured at a rising temperature of 5° C./minute under a nitrogen atmosphere using α-alumina as a reference and using a DSC-8230 model made by Rigaku Denki Co., Ltd. The coloring and transparency were evaluated by observing the obtained pellets by the naked eye. Evaluation standards are as follows. Results are shown in Table 3-6.

Coloring

◎—pale yellow
O —light yellow
X —brown

Transparency

O —transparent
X —turbid

TABLE 3-6

| | | example | | | | | | |
|---|---|---|---|---|---|---|---|---|
| | | 3-1 | 3-2 | 3-3 | 3-4 | 3-5 | 3-6 | 3-7 |
| physical properties of maleimide-based copolymer formed | glass transition temperature (°C.) | 195 | 206 | 203 | 206 | 205 | 192 | 191 |
| | coloring | ◎ | ◎ | ◎ | O | ◎ | X | O |
| | transparency | | | | | | | X |

In all of the examples 3-1 to 3-5, pellets having high glass transition temperature, high transparency and slight coloring were obtained. In the example 3-6, pellets colored and having a low glass transition temperature were obtained and, in the example 3-7, pellets having a low glass transition temperature and bad transparency were obtained.

EXAMPLES 3-8 AND 3-9

A thermoplastic resin composition was obtained with formulation shown in Table 3-7, using the maleimide-based copolymer A-201 obtained from the example 3-1 or the maleimide-based copolymer A-202 obtained from the example 3- 3 and an ABS resin (which is a rubber-modified resin and has a butadiene content of 40%, a styrene content of 42%, and a acrylonitrile content of 18%) as another thermoplastic resin.

The thermoplastic resin composition was converted into pellets by kneading it at a barrel temperature of 240° C. using a twin screw extruder. Using each pellet, injection molding was carried out at 220° C. to obtain a test piece. With a test piece obtained, a heat deflection temperature value and an Izod impact strength value were measured. Results are shown in Table 3-7.

TABLE 3-7

| thermoplastic resin composition | | example 3-8 | example 3-9 |
|---|---|---|---|
| formulation (part) | maleimide-based copolymer (number and amount) | A-201<br>30 | A-202<br>30 |
| | ABS resin | 70 | 70 |
| physical properties | Izod impact value (kg.cm/cm) | 17.8 | 17.6 |
| | heat deflection temperature (°C.) | 111 | 113 |
| | color tone | light yellow | light yellow |

What is claimed are:

1. A process for producing a maleimide-based copolymer having an aromatic vinyl-based monomer unit and a maleimide-based monomer unit, comprising the steps of:

charging into a reaction vessel an organic solvent and a portion of an amount of an aromatic vinyl-based monomer;

gradually supplying the rest of said amount of said aromatic vinyl-based monomer and a maleimide-based monomer separately to said reaction vessel without mixing said aromatic vinyl-based monomer and said maleimide-based monomer beforehand; and polymerizing said aromatic vinyl-based monomer and said maleimide-based monomer.

2. A process for producing a maleimide-based copolymer having an aromatic vinyl-based monomer unit and a maleimide-based monomer unit, comprising the steps of:

charging into a reaction vessel an organic solvent and a portion of an amount of a maleimide-based monomer;

gradually supplying the rest of said amount of said maleimide-based monomer and an aromatic vinyl-based monomer separately to said reaction vessel without mixing said aromatic vinyl-based monomer and said maleimide-based monomer beforehand; and polymerizing said aromatic vinyl-based monomer and said maleimide-based monomer.

3. A process for producing a maleimide-based copolymer having an aromatic vinyl-based monomer unit and a maleimide-based monomer unit, comprising the steps of:

charging an organic solvent into a reaction vessel;

gradually supplying an aromatic vinyl-based monomer and a maleimide-based monomer Separately to said reaction vessel without mixing said aromatic vinyl-based monomer and said maleimide-based monomer beforehand; and polymerizing said aromatic vinyl-based monomer and said maleimide-based monomer.

4. The process according to claim 1 or 2, wherein an amount for use of the organic solvent is in a ratio of from 30 to 70% by weight against the total amount of used materials, and 10 to 80% by weight of a total amount of either the aromatic vinyl-based monomer or the maleimide-based monomer is charged into a reaction vessel beforehand.

5. The process according to anyone of claims 1, 2 or 3 for producing a maleimide-based copolymer, wherein volatile components are removed from a solution obtained by a polymerization reaction and, thus, the maleimide-based copolymer comprises the aromatic vinyl-based monomer unit and the maleimide-based monomer unit as essential composing units, a proportion y of the maleimide-based monomer unit in said maleimide-based copolymer is in a range of from 35 to 65% by weight, a content x of a compound (X) shown by the following general formula (I) is 3% by weight or less and also, it does not exceed a numeral value of 0.06y, and a content of volatile components is 1,000 ppm or less;

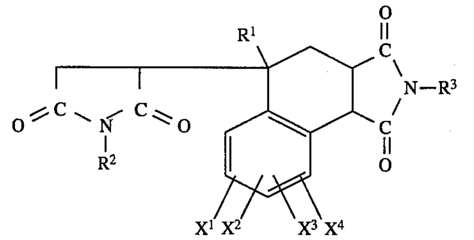

(I)

wherein $R^1$ denotes a hydrogen atom or an alkyl group having a carbon atom number of 1 to 6; $R^2$ and $R^3$ denote independently each other a hydrogen atom, an alkyl group, a cycloalkyl group, an aryl group, or a substituted aryl group; $X^1$ $X^2$ $X^3$ and $X^4$ denote independently each other a hydrogen atom, an alkyl group, or a hydroxyl group.

6. The process according to claim 5, wherein the proportion y of the maleimide-based monomer unit in structure is in a range of from 40 to 65% by weight, and the content x of the compound (X) equals to or is less than a value of (0.06y - 1).

7. The process according to claim 2, wherein said organic solvent has a boiling point in a range of from 60° to 140° C.

8. The process according to claim 5, wherein a weight ratio for use of the organic solvent is in a range of from 0.6 to 0.98 against the total amount of the solvent and the aromatic vinyl-based monomer, and 1,0 to 80% by weight of a total amount of the aromatic vinyl-based monomer is charged into a reaction vessel beforehand.

9. The process according to claim 5, wherein a polymerization-conversion is in a range of from 50 to 95% by weight against the total amount of used monomers.

10. The process according to anyone of claims claim 1, 2 or 3, wherein said maleimide-based monomer is a solid state compound at normal temperature and it is supplied in a molten form or in form of a solution made at a temperature in a range of from 40° to 120° C.

11. The process according to claim 1, wherein 10 to 80% by weight of a-total amount of the aromatic vinyl-based monomer is charged into a reaction vessel beforehand and then, a total amount of the maleimide-based monomer and a residual amount of the aromatic vinyl-based monomer are gradually supplied to the reaction vessel so as to maintain a mole ratio of the aromatic vinyl-based monomer to the maleimide-based monomer in the vessel after polymerization initiation in a range of from 2 to 200 and within 20% above and lower than an expected value.

12. The process according to claim 11, wherein a polymerization reaction .is carried out in the presence of an organic solvent under a boiling condition and, the reaction temperature is controlled within 2° C. above and lower than an expected value.

13. The process according to anyone of claims 1–3, wherein, after the monomers are all supplied to the reaction vessel, a polymerization inhibitor is added into the reaction vessel to carry out a maturing reaction and, thereby, a residual amount of the maleimide-based monomer is lessened with depressing polymerization of the aromatic vinyl-based monomer.

14. The process according to claim 13, wherein a maturing reaction is carried out in the presence of oxygen.

15. The process according to claim 14, wherein catechols are used as a polymerization inhibitor.

* * * * *